United States Patent
Nakata et al.

(10) Patent No.: US 8,427,928 B2
(45) Date of Patent: Apr. 23, 2013

(54) OPTICAL HEAD AND OPTICAL INFORMATION DEVICE

(75) Inventors: Hideki Nakata, Kyoto (JP); Kousei Sano, Osaka (JP); Takashi Haruguchi, Fukuoka (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 12/933,899

(22) PCT Filed: Jan. 26, 2010

(86) PCT No.: PCT/JP2010/000428
§ 371 (c)(1),
(2), (4) Date: Sep. 22, 2010

(87) PCT Pub. No.: WO2010/084784
PCT Pub. Date: Jul. 29, 2010

(65) Prior Publication Data
US 2011/0019524 A1    Jan. 27, 2011

(30) Foreign Application Priority Data
Jan. 26, 2009 (JP) ................. 2009-014020

(51) Int. Cl.
*G11B 7/135* (2006.01)
*G11B 7/00* (2006.01)
*G11B 20/18* (2006.01)

(52) U.S. Cl.
USPC ............. 369/116; 369/112.23; 369/112.26; 369/112.01

(58) Field of Classification Search ......... 369/112.11, 369/112.13, 112.23–112.26, 116, 118, 120; 720/681
See application file for complete search history.

(56) References Cited

U.S. PATENT DOCUMENTS

| 5,022,725 A * | 6/1991 | Matsunami et al. ......... 359/726 |
| 5,497,366 A * | 3/1996 | Fujisawa ................. 369/112.24 |
| 5,808,999 A * | 9/1998 | Yagi ....................... 369/112.26 |
| 2002/0131348 A1 * | 9/2002 | Furuhata et al. ........... 369/44.37 |

(Continued)

FOREIGN PATENT DOCUMENTS

| JP | 61-72719 | 5/1986 |
| JP | 62-157349 | 7/1987 |

(Continued)

OTHER PUBLICATIONS

International Search Report issued Mar. 30, 2010 in International (PCT) Application No. PCT/JP2010/000428.

*Primary Examiner* — Wayne Young
*Assistant Examiner* — Dionne Pendleton
(74) *Attorney, Agent, or Firm* — Wenderoth, Lind & Ponack, L.L.P.

(57) ABSTRACT

An optical head 200 comprises: a light source 101 that emits a light beam; an objective lens 105 that condenses, in the form of converging light, the light beam emitted by the light source 101, onto an information recording medium; a cylindrical lens 115 onto which a reflected light beam that is reflected by the information recording medium is incident, and which generates astigmatism for forming a focus error signal; a light detector 120 that receives the reflected light beam passing through the cylindrical lens 115; and a holder 130 that holds the cylindrical lens 115 and the light detector 120. The holder 130 has a first main face and a second main face that extend in directions that intersect the optical axis of the reflected light beam. The cylindrical lens 115 is bonded to the first main face and the light detector 120 is bonded to the second main face.

13 Claims, 29 Drawing Sheets

U.S. PATENT DOCUMENTS

2003/0174420 A1* 9/2003 Rudischhauser et al. ..... 359/819
2005/0276207 A1* 12/2005 Oka et al. .................. 369/112.23
2007/0159952 A1* 7/2007 Mimori et al. ........... 369/112.05

FOREIGN PATENT DOCUMENTS

| JP | 1-102509 | 4/1989 |
|---|---|---|
| JP | 1-224935 | 9/1989 |
| JP | 4-299306 | 10/1992 |
| JP | 5-109112 | 4/1993 |
| JP | 5-281036 | 10/1993 |
| JP | 5-290404 | 11/1993 |
| JP | 10-3683 | 1/1998 |
| JP | 2005-268443 | 9/2005 |

* cited by examiner

|  | MAGNIFICATION OF THE DETECTION OPTICAL SYSTEM (LATERAL MAGNIFICATION $\beta$) | | | |
|---|---|---|---|---|
|  | 10 | 12 | 14 | 16 |
| CONCAVE LENS PORTION RADIUS (mm) | 12 | 4.4 | 2.6 | 1.9 |
| SPOT DIAMETER OFFSET ($\mu$m) | 1.2 | 2.1 | 3.1 | 4 |

DIRECTION Y

PD BALANCE DEFINITION (DIRECTION Y)
=((A+D)−(B+C))/(A+B+C+D)

DIRECTION Y
↑
●→DIRECTION X
DIRECTION Z

DIRECTION Y
↑
●→DIRECTION X
DIRECTION Z

OPTICAL HEAD AND OPTICAL INFORMATION DEVICE

TECHNICAL FIELD

The present invention relates to an optical head and an optical information device that record information on an information recording medium such as an optical disk, an optical card or the like, or that reproduce recorded information therefrom.

BACKGROUND ART

Known conventional optical heads include optical heads configured in such a manner that a cylindrical lens and a lens holder are integrated together but the cylindrical lens and a light detector are separated from each other (for instance, Patent Document 1).

FIG. 27 and FIG. 28 illustrate an optical head, and a light-detection section thereof, disclosed in Patent Document 1.

In FIG. 27, a beam of light emitted by a semiconductor laser 101 is split into a plurality of different light beams by a diffraction grating 102. The light beams passing through the diffraction grating 102 are reflected by a beam splitter 103, and are converted into parallel light beams by a collimator lens 104. These light beams enter an objective lens 105 and become so-called three-beam converging light that is irradiated onto an optical disk 201. An objective lens actuator 106 drives the objective lens 105 in the optical axis direction (focus direction) and the radial direction of the optical disk 201. The beams of light reflected and diffracted by an information layer 202 of the optical disk 201 pass again through the objective lens 105, and then through the beam splitter 103. The light beams that traverse the beam splitter 103 pass through a cylindrical lens 115, and is incident on a light detector 120.

FIG. 28 is a partial schematic diagram of an optical head 200. An optical base 113 holds the semiconductor laser 101, the diffraction grating 102, the beam splitter 103, the collimator lens 104 and an objective lens actuator 106. The cylindrical lens 115 is disposed in such a manner that a concave cylindrical lens surface thereof, having negative power (concave lens effect), is on the side of the light detector. The position of the cylindrical lens 115 in the optical axis direction can be adjusted along the optical base 113 in a state where the cylindrical lens 115 is fixed to the lens holder 159. The cylindrical lens 115 is held in this state by an external jig. The position of the light detector 120 can be adjusted within a plane (X-Y plane) that is perpendicular to the optical axis, in a state where the light detector 120 is held by an external jig.

FIG. 29 illustrates schematically a light-receiving surface 121 of the light detector 120. A light beam that transmits the cylindrical lens 115 is received at a four-quadrant light-receiving region 140. The differences between the sum signals of diagonally-opposing regions within the four-quadrant light-receiving region 140 are computed to detect thereby a so-called focus signal. An RF signal is also detected by computing the sum signals from the four-quadrant light-receiving region 140.

A push-pull signal resulting from computing the signals obtained from the four-quadrant light-receiving region 140, plus signals corresponding to the quantity of light that is received at sub-beam light-receiving regions 141, are computed by a summing amplifier 144 and a differential amplifier 145. The three-beam method (so-called DPP method) yields a tracking error signal on the basis of which tracking servo is carried out in order to cause the objective lens 105 to follow a track in the information layer 202.

In order to secure symmetry and linearity in the focus error signal, the light detector 120 is disposed spaced apart from the concave cylindrical lens surface of the cylindrical lens 115. To that end, the position of the light detector 120, alone or together with the holder, is adjusted within the X-Y plane. This position adjustment is carried out while referring to the detection signal from the light detector 120, in such a manner that a light beam enters substantially the center of the four-quadrant light-receiving section 140. Thereafter, the light detector 120 (or holder) is fixed to the optical base 113.

The lens holder 159 to which the cylindrical lens 115 is fixed is held in a state whereby the lens holder 159 can move over the optical base 113 in the optical axis direction. The relative position with respect to the light detector 120 is adjusted by adjusting the cylindrical lens 115 in direction Z. The optical base 113 and a lens holder 159 are then fixed together. Through this adjustment in direction Z, the objective lens 105 and the information layer 202 become positioned at a just focus distance, and the focus error signal offset is cancelled. Specifically, the output of the focus error signal at the just focus distance is 0.

Optical heads are expected to be developed wherein the optical head can support recording or reproduction to/from small, high recording-density multilayer optical disks having two or more recording layers.

In order to support recording and reproduction to/from high recording-density multilayer optical disks, and to reduce the size of the optical head, large negative lens power is required to be achieved by forming a concave lens surface, having a small radius of curvature, on the cylindrical lens.

In an optical system having an optical head, however, it is impossible to avoid small errors during adjustment of the position of the light detector in directions X-Y and during adjustment of the position of the cylindrical lens in direction Z. As a result, a relative positional error between the light detector and the cylindrical lens arises on account of the positional offset of the cylindrical lens in direction Z and directions X-Y. This gives rise in turn to error in the position of the cylindrical lens in direction Z.

When such an optical system is fitted with a cylindrical lens having high lens power, such as the one described above, magnification by the detection optical system varies significantly depending on the relative positional error, and sub-beams may bear away from the sub-beam light-receiving regions of the light detector. In the light detector, angle error and positional error, in directions X-Y, with respect to the optical axis, cause the sub-beams to bear away, by a greater distance, from the sub-beam light-receiving regions, and give rise to significant deterioration of the quality of the tracking error signal, which may impair recording and reproduction performance. Thus, reducing the size of detection optical systems equipped with high-power cylindrical lenses is extremely difficult in optical systems having conventional optical heads.

Patent Document 1: JP 10-003683 A

SUMMARY OF THE INVENTION

It is an object of the present invention to provide an optical head that is small and in which signal characteristics can be improved upon recording and reproduction to/from a multilayer optical information recording medium of high recording density.

An optical head according to an aspect of the present invention comprises a light source that emits a light beam; an objective lens that condenses, in the form of converging light, the light beam emitted by the light source, onto an information recording medium; a cylindrical lens, onto which a reflected light beam that is reflected by the information recording medium is incident, and which generates astigmatism for forming a focus error signal; a light detector that receives the reflected light beam passing through the cylindrical lens; and a holder that holds the cylindrical lens and the light detector. The holder has a first main face and a second main face that extend in directions that intersect the optical axis of the reflected light beam, such that the cylindrical lens is bonded to the first main face and the light detector is bonded to the second main face.

BRIEF DESCRIPTION OF THE DRAWINGS

FIG. 24B is a front-view diagram illustrating schematically the detector unit.

DETAILED DESCRIPTION OF THE PREFERRED EMBODIMENTS OF THE INVENTION

Embodiments for carrying out the present invention will be explained in detail below with reference to accompanying drawings.

Embodiment 1

Figure 1:
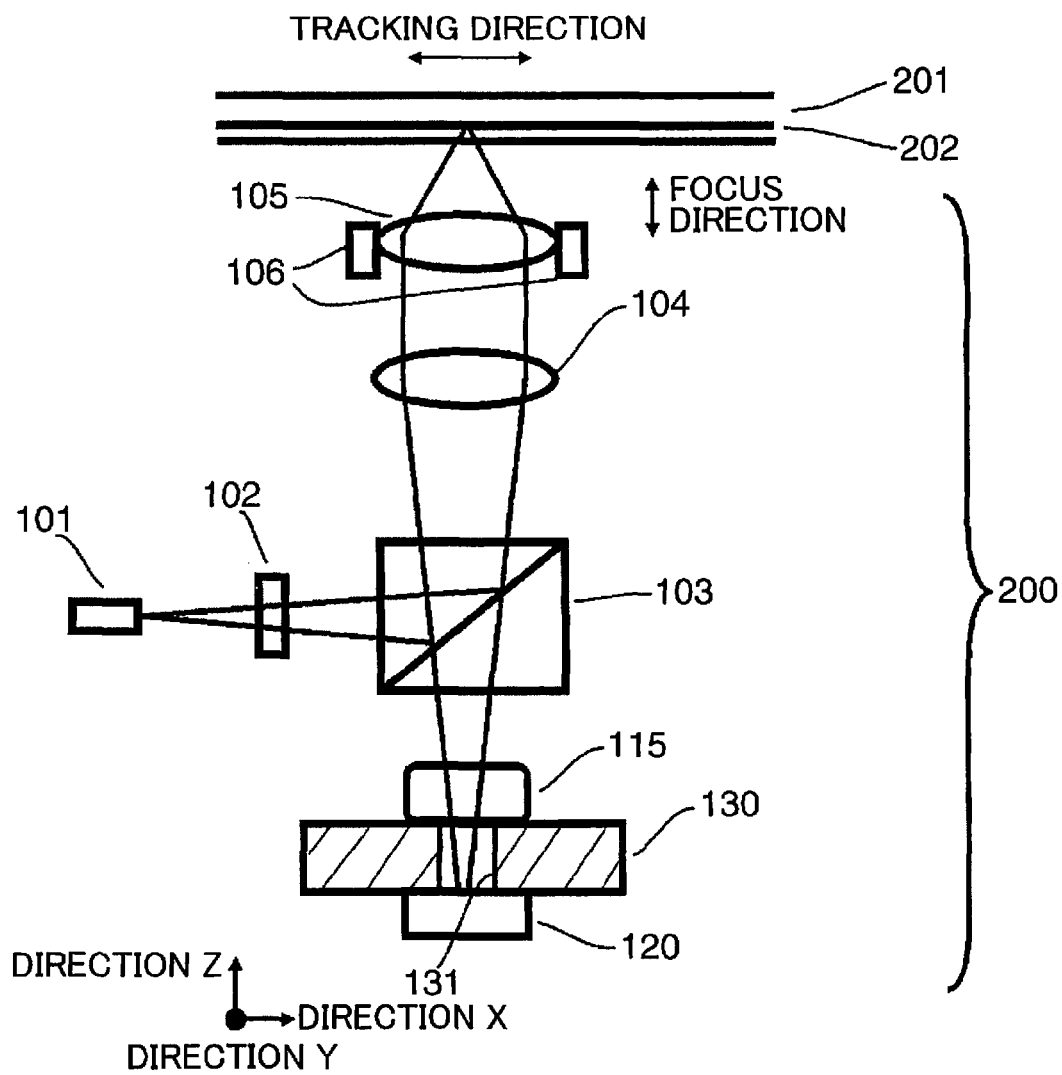
FIG. 1 is a diagram illustrating schematically an optical system of an optical head according to a first embodiment of the present invention.
Figure 27:
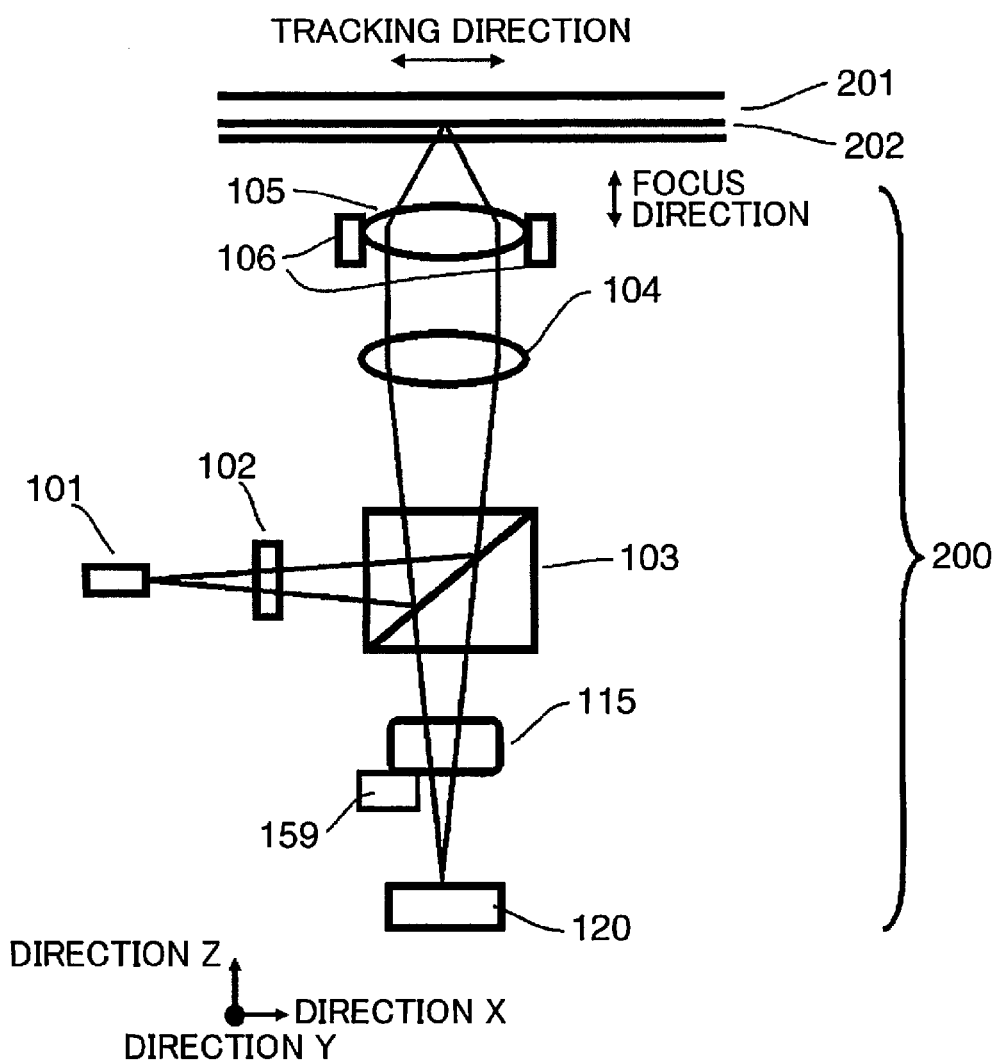
FIG. 27 is a diagram illustrating schematically the configuration of an optical system in a conventional optical head.
Figure 28:
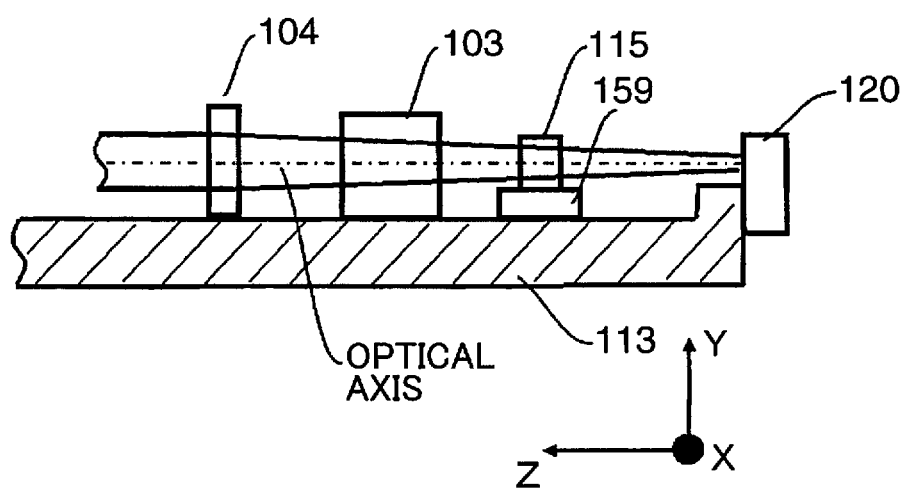
FIG. 28 is a diagram partially illustrating a conventional optical head.
Figure 29:
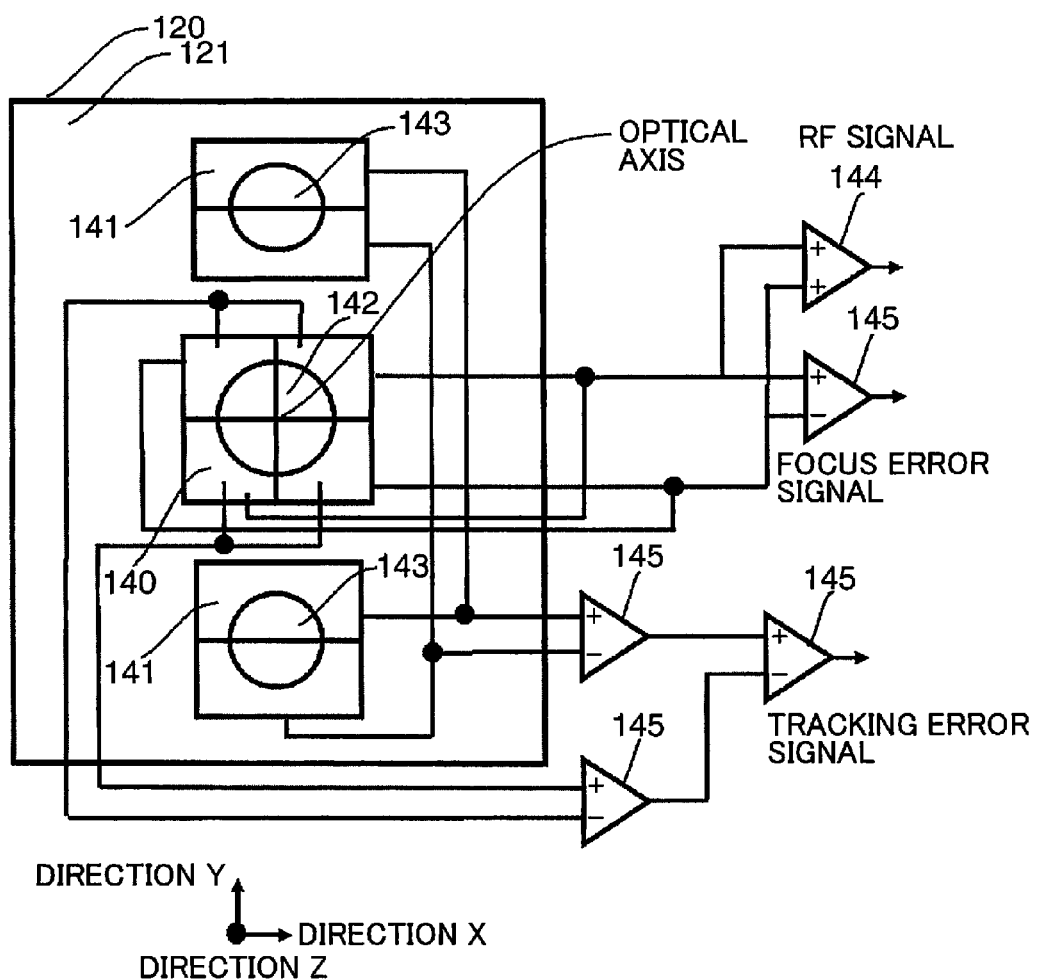
FIG. 29 is a diagram for explaining a light-receiving surface arrangement, and signal extraction, in a light detector of a conventional optical head.

FIG. 1 illustrates schematically an optical system of an optical head 200 according to a first embodiment of the present invention. In FIG. 1, constituent elements identical to those illustrated in FIG. 27 are explained using the same reference numerals.

As illustrated in FIG. 1, the optical system of the optical head 200 comprises a semiconductor laser 101 as a light source, a diffraction grating 102, a beam splitter 103, a collimator lens 104, an objective lens 105, a cylindrical lens 115 and a light detector 120.

The light beam emitted by the semiconductor laser 101 is split into a plurality of light beams by the diffraction grating 102. The light beams that pass through the diffraction grating 102 are reflected by the beam splitter 103, are converted into parallel light beams by the collimator lens 104, and are incident on the objective lens 105 in the form of so-called three-beam converging light. The converging light is irradiated onto an optical disk 201. An objective lens actuator 106 drives the objective lens 105 in the optical axis direction (focus direction) and the tracking direction (radial direction) of the optical disk 201. The light beams reflected and diffracted by an information layer 202 of the optical disk 201 pass again through the objective lens 105, then through the collimating lens 104, and are incident on the beam splitter 103. The light beam that traverse the beam splitter 103 pass through the cylindrical lens 115, and through an aperture 131 of a holder 130, and are incident on the light detector 120.

Figure 2A:
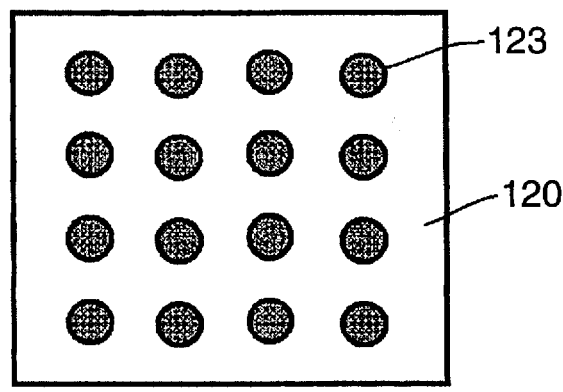
FIG. 2A is a side-view diagram illustrating schematically a light detector provided in the optical head according to the first embodiment of the present invention.
Figure 2B:
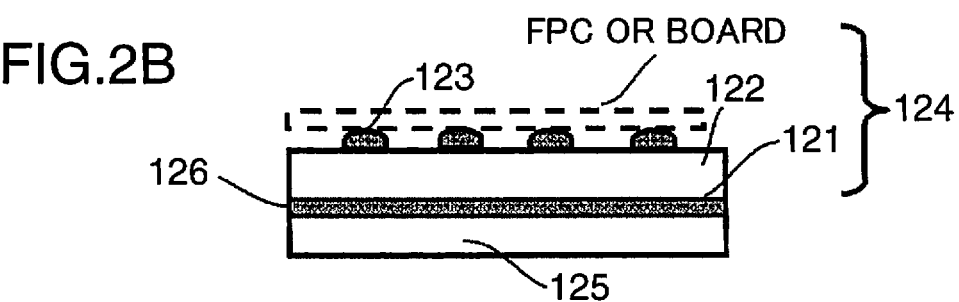
FIG. 2B is a front-view diagram illustrating schematically the light detector.
Figure 2C:
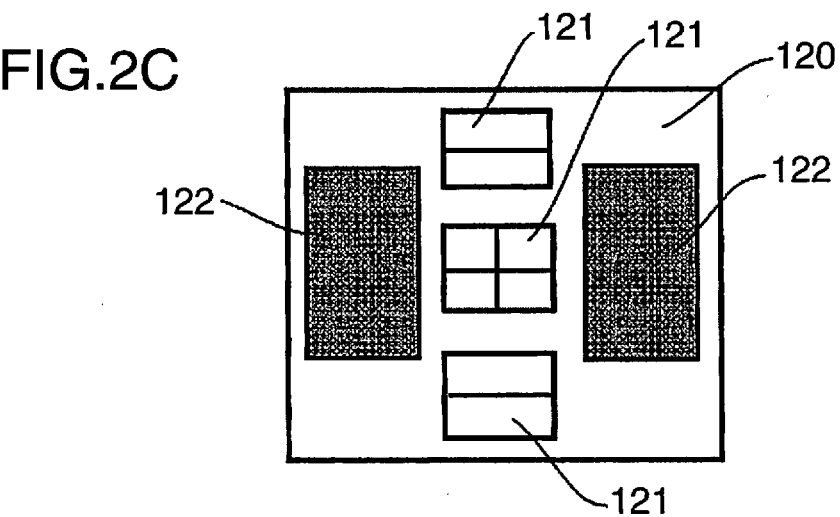
FIG. 2C is a side-view diagram illustrating schematically the light detector.

FIGS. 2A to 2C illustrate an example of the light detector 120. The light detector 120 comprises a light-receiving section 124, a cover glass 125 and a bonding layer 126. The light-receiving section 124 comprises a light-receiving surface 121 having a light-receiving region, circuit sections 122 and terminals 123. The bonding layer 126 bonds the light-receiving section 124 and the cover glass 125. That is, the light-receiving section 124 is fixed to the cover glass 125. The terminals 123 are mounted and soldered to an FPC or a board. The terminals 123 output signals in accordance with the quantity of received light as detected by the light-receiving surfaces 121.

Figure 3:
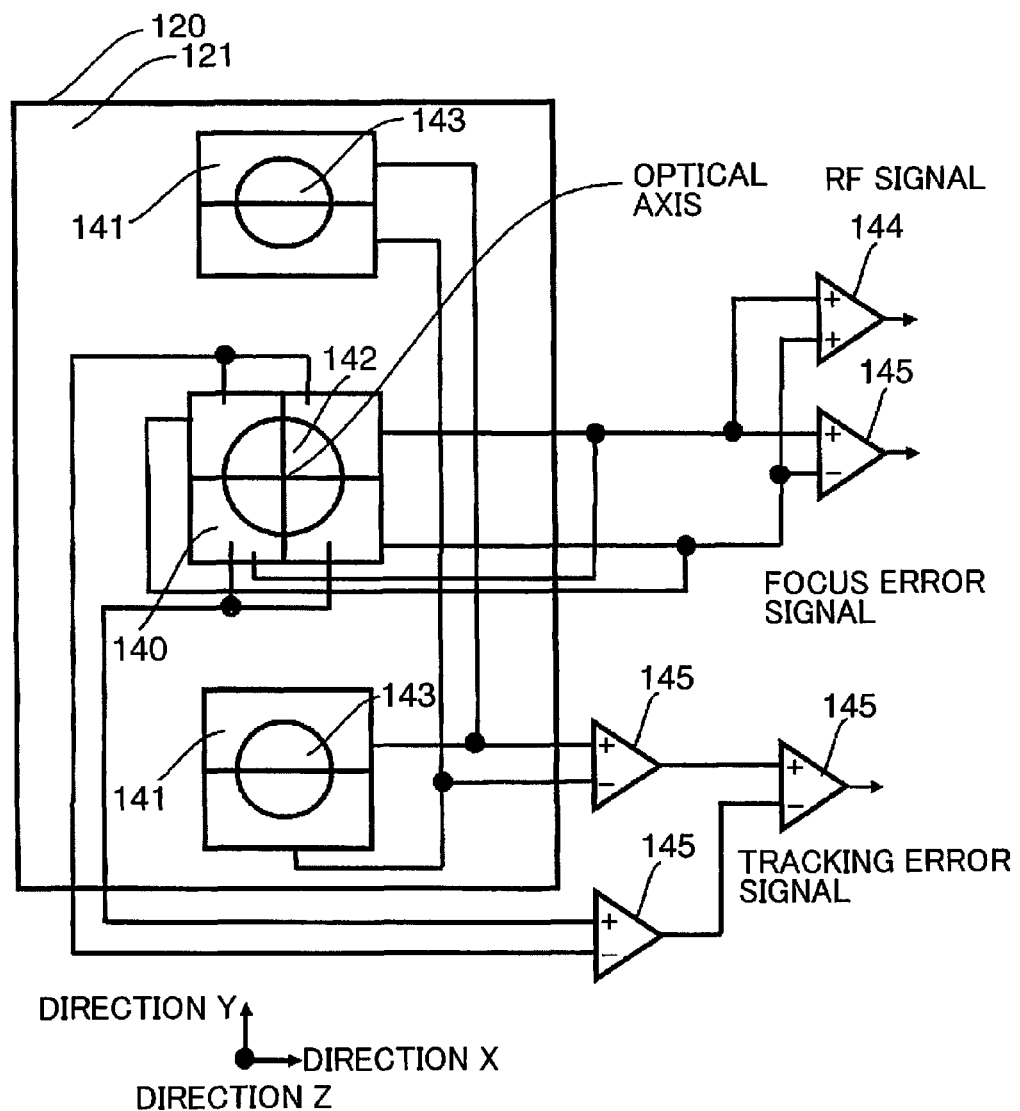
FIG. 3 is a diagram for explaining a light-receiving surface arrangement, and signal extraction, in the light detector provided in the optical head according to the first embodiment of the present invention.

FIG. 3 illustrates schematically a light-receiving surface 121 of the light detector 120. The light-receiving surface 121 has formed thereon a four-quadrant light-receiving region 140 and sub-beam light-receiving regions 141. A main beam 142, from among the light beams that traverse the cylindrical lens 115, is received by the four-quadrant light-receiving region 140. The difference between signals at the two pair of diagonally-opposing regions within the four-quadrant light-receiving region 140 (difference between the two sum signals of the diagonally-opposing regions) is computed by a summing amplifier 144 and a differential amplifier 145, to detect thereby a focus signal. An RF signal is detected through computation, by the summing amplifier 144, of the sum signals from the respective regions of the four-quadrant light-receiving region 140.

Sub-beams in the form of reflected light beams that are reflected by a track in the information layer 202 of the optical disk 201, and that yield a tracking error signal according to a three-beam method, are incident on the sub-beam light-receiving regions 141 of the light detector 120. Sub-beams 143, from among the light beams that traverse the cylindrical lens 115, are received at the sub-beam light-receiving regions 141.

A summing amplifier 141 and a differential amplifier 142 calculate a signal corresponding to the quantity of received light at the sub-beam light-receiving regions 141 on the basis of a push-pull signal from a signal corresponding to the quantity of received light at the four-quadrant light-receiving region 140, to generate thereby a tracking error signal in accordance with a three-beam method (so-called DPP method).

Figure 4A:
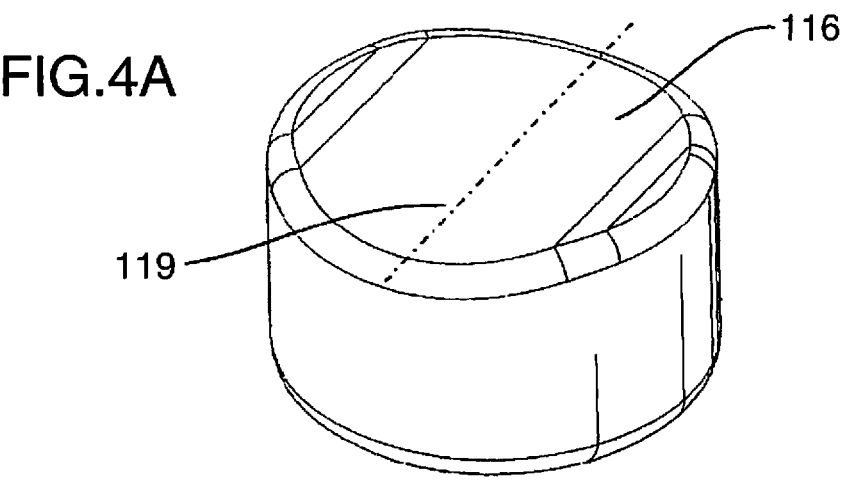
FIG. 4A is a perspective-view diagram of a cylindrical lens provided in the first embodiment of the present invention.
Figure 4B:
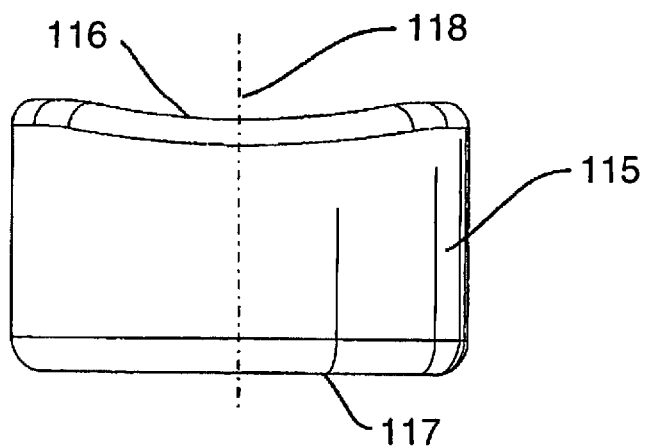
FIG. 4B is a front-view diagram of the cylindrical lens.
Figure 4C:
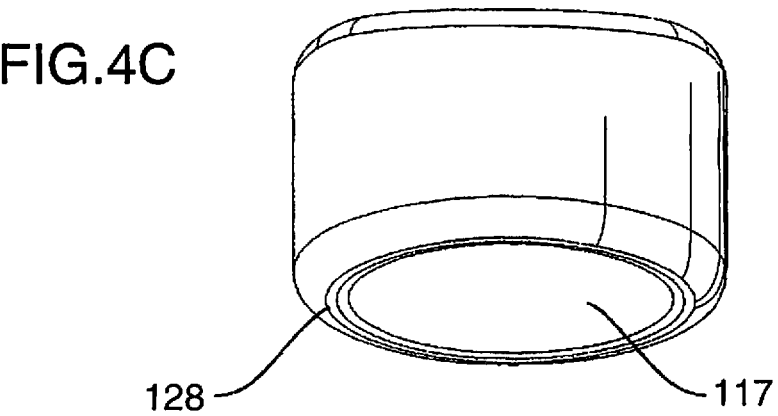
FIG. 4C is a perspective-view diagram of the cylindrical lens viewed from a different angle from FIG. 4A.

FIGS. 4A to 4C illustrate the configuration of the cylindrical lens 115. FIG. 4B is a front-view diagram of the cylindrical lens 115. FIG. 4A is a perspective-view diagram viewed from an incidence surface, and FIG. 4C is a perspective-view diagram viewed from the exit surface.

The cylindrical lens 115 is shaped overall as a solid cylinder. A cylindrical surface 116 is formed at one end face of the cylindrical lens 115, in the axial direction, while a concave lens surface 117 having lens power, and a flat surface 128 that surrounds the concave lens surface 117, are formed at the other end face of the cylindrical lens 115. The cylindrical lens 115 is disposed in such a manner that the cylindrical surface 116 is an incidence surface for light beams, and the concave lens surface 117 is an exit surface. The flat surface 128 is a surface perpendicular to the lens optical axis 118 of the cylindrical lens 115, and forms a circular ring that is coaxial with the lens optical axis. In the figure, the reference numeral 119 denotes the central generatrix of the cylindrical surface 116. The central generatrix coincides with the generatrix that intersects the lens optical axis, from among the generatrices that form the cylindrical surface 116. The lens optical axis 118 passes through the center of the concave lens surface 117. The cylindrical surface 116 is positioned furthest inward in the lens optical axis direction, at the position of the central generatrix 119.

The optical head 200 of the first embodiment comprises a detector unit 127. The detector unit 127 comprises the cylindrical lens 115, the holder 130 and the light detector 120, and is disposed in such a manner that the cylindrical lens 115, the holder 130 and the light detector 120 are positioned in this order from the side at which the reflected light beam is incident.

Unlike in the case of optical heads where the cylindrical lens is provided spaced apart from the light detector, the optical head 200 of the present embodiment has the holder 130 between the cylindrical lens 115 and the light detector 120, with both the cylindrical lens 115 and the light detector 120 in contact with the holder 130. The cylindrical lens 115 is bonded to the holder 130 in such a manner that the cylindrical lens 115 is disposed at one side of the holder 130 in direction Z (optical axis direction of the reflected light beam). The light detector 120 is bonded to the holder 130 in such a manner that the light detector 120 is disposed at the other side of the holder 130 in direction Z.

Figure 5:
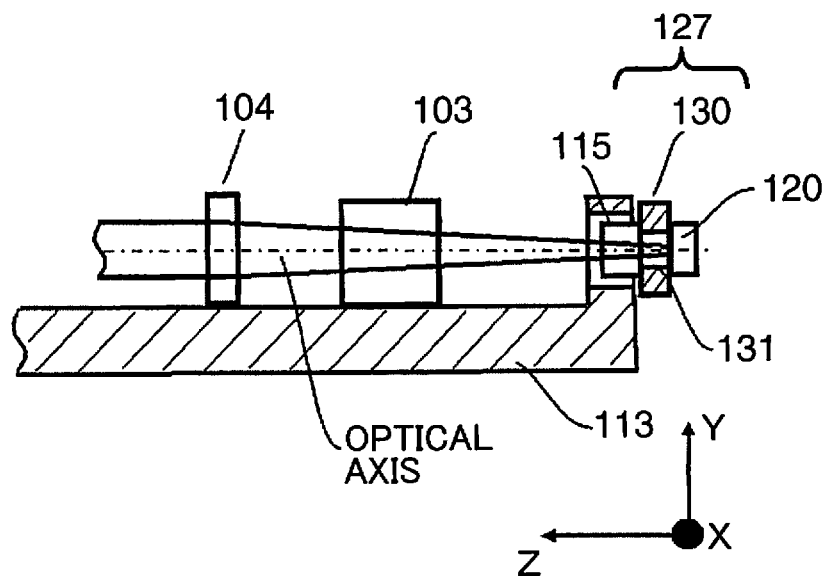
FIG. 5 is a schematic diagram illustrating partially the optical head according to the first embodiment of the present invention.

FIG. 5 illustrates part of the optical head 200. As illustrated in FIG. 5, an optical base 113 is provided in the optical head 200. The optical base 113 holds, for example, the semiconductor laser 101 (FIG. 1), the diffraction grating 102 (FIG. 1), the beam splitter 103, the collimator lens 104 and the objective lens actuator 106 (FIG. 1). The detector unit 127 is gripped by an external jig (not shown), at holding portions 132 (FIG. 6A), with respect to the optical base 113. In that state, the position of the detector unit 127 can be adjusted in direction Z (optical axis direction) along the optical base 113, and within the X-Y plane (plane perpendicular to the optical axis).

An explanation follows next on a method for adjusting the position of the detector unit 127 with respect to the optical base 113 and the optical axis. Adjustment of the detector unit 127 within the X-Y plane is performed by displacing the detector unit 127 in such a manner that the main beam 142 are incident on substantially the center of the four-quadrant light-receiving region 140. The position of the detector unit 127 in direction Z is adjusted through fine adjustment of the detector unit 127 in direction Z in such a manner that the light-receiving surface 121 is positioned at an astigmatic-difference focal position, in a state where the positional relationship of the objective lens 105 and the information recording layer 202 is that of just focus. As a result of that fine adjustment, the main beam that is incident on the four-quadrant light-receiving region 140 takes on a circular shape whereby offset in the focus error signal is cancelled. The output of the focus error signal becomes 0 since the objective lens 105 and the information recording layer 202 are now in just focus. The sub-beams 143 are caused to enter substantially the center of the sub-beam light-receiving regions 141 through adjustment (θz) of the reflected light beams about the optical axis. The balance of the focus error signal is adjusted (according to a definition set forth below) through adjustment in direction X and direction Y, offset of the tracking error signal is adjusted through rotation adjustment (θz), and focus offset of the focus error signal is adjusted through adjustment in direction Z. The position of the detector unit 127 is thus adjusted in direction Z and directions X-Y as described above. In the optical head 200 of the present embodiment, however, the cylindrical lens and the light detector 120 are both fixed to the holder 130, and hence the relative positional offset of the cylindrical lens 115 and the light detector 120 can be reduced vis-à-vis that in conventional optical heads.

Figure 6A:
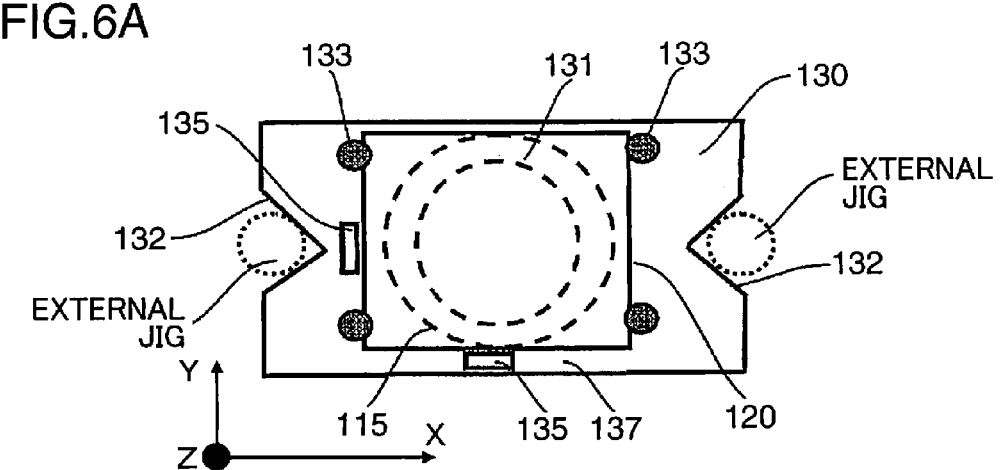
FIG. 6A is a side-view diagram illustrating schematically a detector unit provided in the optical head of the first embodiment of the present invention.
Figure 6B:
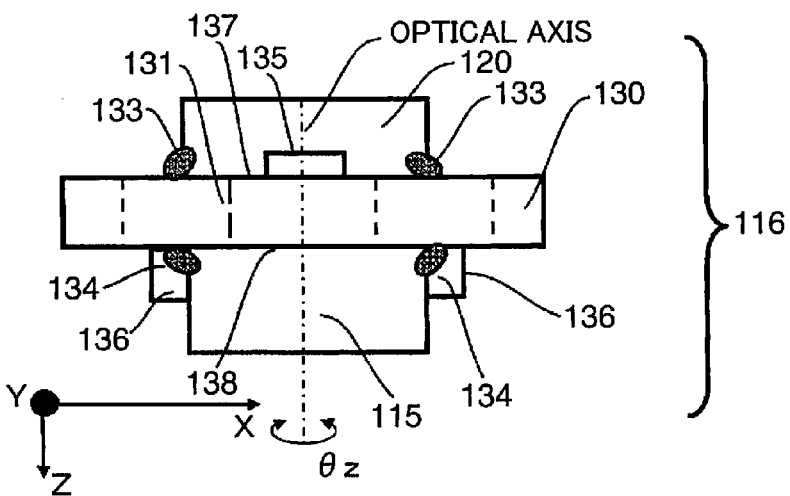
FIG. 6B is a front-view diagram illustrating schematically the detector unit.
Figure 6C:
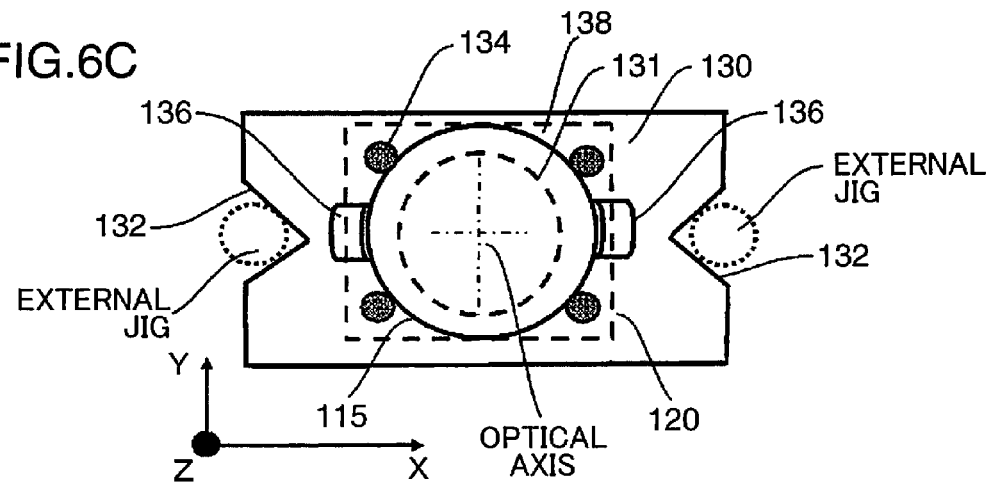
FIG. 6C is a side-view diagram illustrating schematically the detector unit.

FIGS. 6A to 6C illustrate the configuration of the detector unit 127. FIG. 6A is a side-view diagram viewed from the light detector, FIG. 6C is a side-view diagram viewed from the cylindrical lens, and FIG. 6B is a front-view diagram.

The holder 130 is formed as a flat plate having a constant thickness. The holder 130 comprises, for example, a tubular aperture 131, holding portions 132, a light detector pressing section 137, light detector positioning sections 135, a cylindrical lens pressing section 138 and cylindrical lens positioning sections 136. The cylindrical lens 115 is bonded to the face of the holder 130 at the side on which light reflected by the optical disk is incident. The light detector 120 is bonded to the holder 130 at the face on the opposite side thereto. One of the main faces of the holder 130 at which the cylindrical lens 115 is bonded (one end face in the optical axis direction of the reflected light beam) may also be referred to as a first main face, and the other main face of the holder 130 at which the light detector 120 is bonded may also be referred to as second main face. The first main face and second main face are set to be parallel to each other.

The light detector pressing section 137 is a section formed on the second main face of the holder 130, and is positioned at substantially the center of the second main face. Specifically, part of the second main face functions as the light detector pressing section 137. The light detector 120 is in face contact with the light detector pressing section 137. With the light detector positioning sections 135 being provided on the second main face, the light detector 120 can be positioned in direction X and direction Y in use of this the light detector positioning sections 135.

The cylindrical lens pressing section 138 is formed on the first main face of the holder 130, at a position substantially in the center of the first main face. Specifically, part of the first main face functions as the cylindrical lens pressing section 138. The flat surface 128 of the cylindrical lens 115 is in face contact with the cylindrical lens pressing section 138. The cylindrical lens positioning sections 136, which are provided on the first main face, have a circular arc surface that is formed concentrically with the aperture 131. This circular arc surface opposes the peripheral face of the cylindrical lens 115. The cylindrical lens positioning sections 136 are used to allow positioning the cylindrical lens 115 in direction X and direction Y, and to allow the cylindrical lens 115 to rotate smoothly about the optical axis during adjustment of the orientation of the cylindrical lens 115 in the peripheral direction.

The aperture 131 is formed within the area of the light detector pressing section 137 and the cylindrical lens pressing section 138, as viewed in the optical axis direction. The aperture 131 is an opening, having a circular cross-section, that runs through the holder 130 in the thickness direction thereof.

The thickness of the holder 130 is controlled so as to be constant. As a result, the gap between the light detector 120 and the cylindrical lens 115 can be defined with good precision, and the orientation of the cylindrical lens 115 can be matched, with good precision as well, to the optical axis direction of the reflected light beam. The thickness of the holder 130 is, for instance, about 1.5 mm.

To position the light detector 120, the holding portions 132 of the holder 130 are gripped by an external jig (not shown), and in that state, the light detector 120 is pressed against the light detector pressing section 137, to position thereby the light detector 120 by way of the light detector positioning sections 135. The light detector 120 is positioned as a result, with good precision, in direction X, direction Y and direction Z, with respect to the holder 130. In that state, the light detector 120 is bonded and fixed by way of light detector bonding sections 133.

In the above configuration, unlike optical heads in which the light detector and the cylindrical lens are built separately, the positional error of the cylindrical lens 115 and the light detector 120 in direction Z is given by the dimensional error of the holder 130 alone. This dimensional error is determined by the precision of the holder 130 as a component, in terms of molding precision and machining precision. The dimensional error can therefore be kept low, between about 5 and 20 μm. In a rough approximation, as described below, the positional offset between a light detector and a cylindrical lens in conventional optical heads is of about 300μ. The configuration in the present embodiment allows thus reducing such positional offset significantly. A smaller positional offset of the beam of light that strikes the light detector 120 allows in turn preventing impairment of the characteristics of the recording and reproduction signals.

The cylindrical lens 115 is positioned in direction X and direction Y by way of the cylindrical lens positioning sections 136. The cylindrical lens 115 is positioned in direction Z through pressing of the flat surface 128 of the cylindrical lens 115 against the cylindrical lens pressing section 138. The cylindrical lens 115 is disposed in such a manner that the incidence surface side thereof becomes the cylindrical surface 116. As a result, the orientation of the central generatrix 119 of the cylindrical surface 116 can be checked easily and with high precision by causing parallel light beams to strike the cylindrical surface 116, using an auto-collimator or the like, not shown, and checking then the shape of the reflected light beam (central generatrix 119 of the cylindrical surface 116). Specifically, the rotation direction of the cylindrical lens 115 may be adjusted by detecting the angle of the cylindrical surface 116 (orientation of the central generatrix 119 of the cylindrical surface 116), using an external measurement device (not shown) such as an auto-collimator or the like. The cylindrical lens 115 may then be bonded and fixed to the holder 130 by way of the cylindrical lens bonding sections 134. The light detector 120 and the cylindrical lens 115 can be positioned thereby, with greater precision, with respect to the holder 130 and the aperture 131.

In the optical system of the present embodiment, the cylindrical surface 116 of the cylindrical lens 115 is positioned at the incidence side of the light beam reflected from the optical information medium. The cylindrical lens is not supposed to be at a close distance from the light detector in optical heads of detection optical systems of low magnification, and hence the cylindrical surface 116 is disposed on the side of the light detector. In the present embodiment, by contrast, the cylindrical lens 115 and the detector 120 are disposed so as to sandwich the holder 130 therebetween. Therefore, the distance between the cylindrical surface 116 and the light-receiving surface of the light detector 120 is smaller when the cylindrical lens surface 116 is disposed on the side of the light detector 120. The focus error signal performance may become impaired as a result. In the present embodiment, therefore, the cylindrical lens 115 is disposed in such a manner that the cylindrical surface 116 stands on the side of the light incidence surface. The above configuration allows increasing the astigmatic difference also when the magnification of the detection optical system is large.

Figure 7:
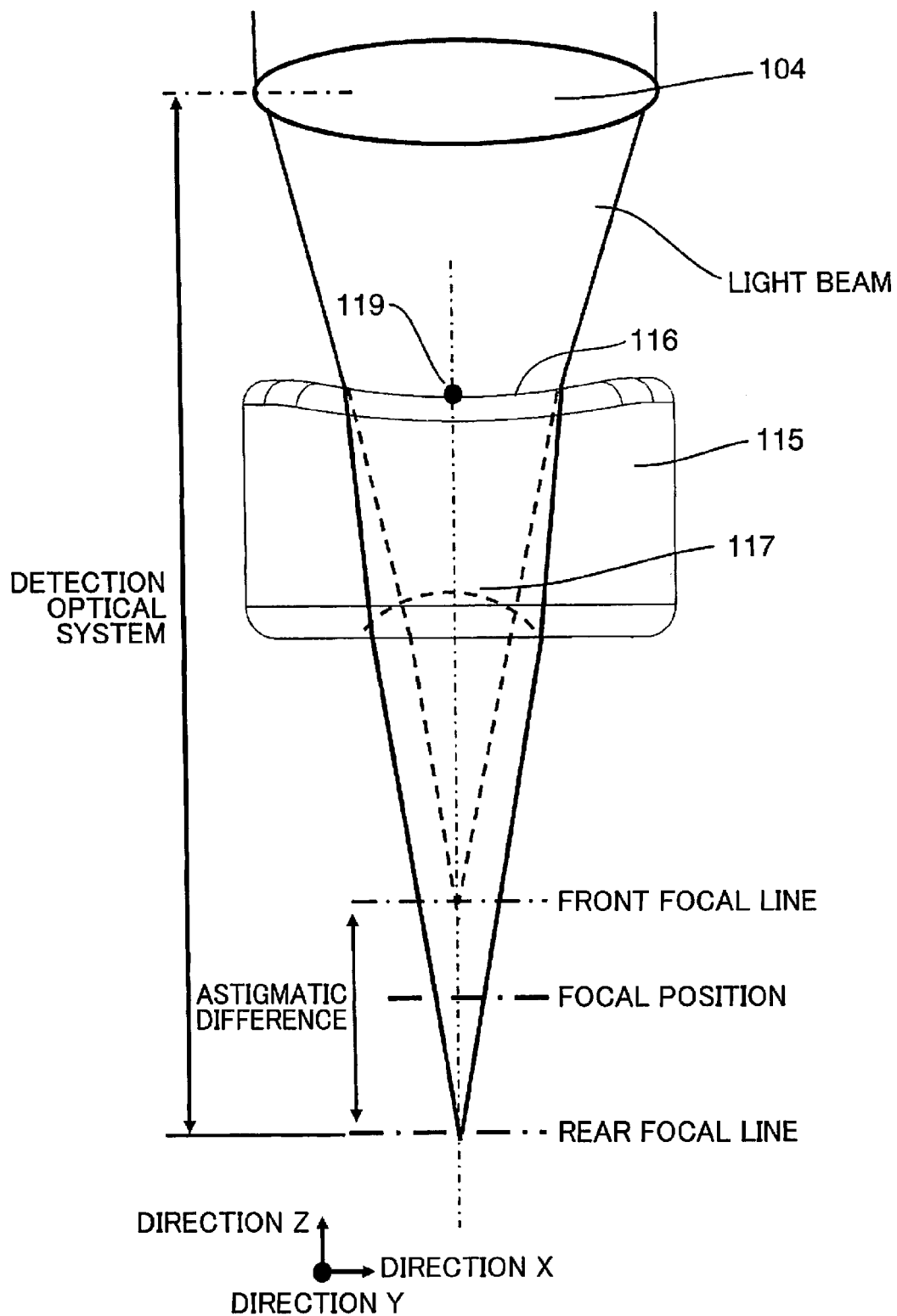
FIG. 7 is a diagram for explaining a beam of light that passes through the cylindrical lens.

As a result, the distance between the front focal line and the focal position and the distance between the rear focal line and the focal position can be made greater, with better balance. Focus error signals having good symmetry can be realized thereby, and also the quality of the focus servo can be enhanced. FIG. 7 illustrates a front focal line, a focal position and a rear focal line.

Figure 10:
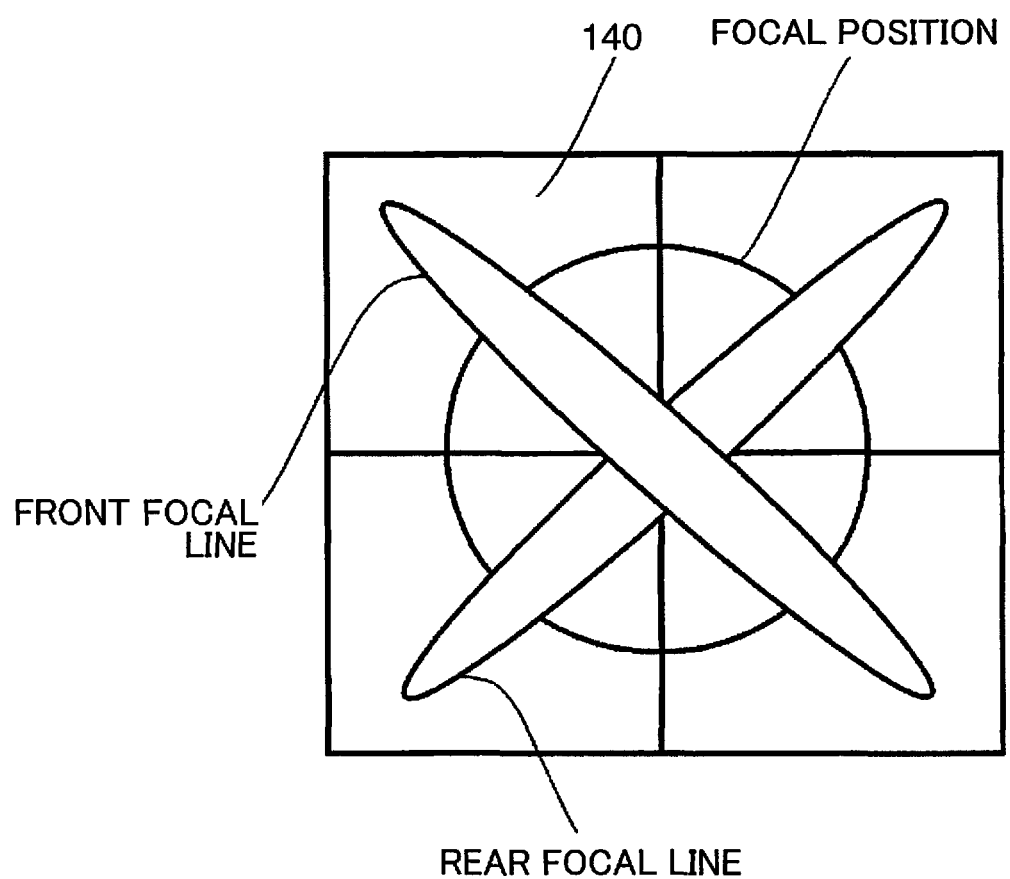
FIG. 10 is a diagram for explaining the shape of a light beam that is incident on a four-quadrant light-receiving region of the light detector of the optical head according to the first embodiment of the present invention.

The holder 130 is in contact with the flat surface 128 of the cylindrical lens 115 upon adjustment of the orientation of the central generatrix 119 of the cylindrical surface 116 in the peripheral direction. The abutting surface area between the cylindrical lens 115 and the holder 130 is accordingly large. As a result, rotation of the central generatrix 119 of the cylindrical surface 116 about the lens optical axis 118 can be adjusted once the relative angle between the cylindrical lens 115 and the holder 130 is stabilized. As used herein, the term rotation adjustment denotes adjustment of the orientation of the central generatrix 119 of the cylindrical surface 116 with respect to direction of the parting lines of the four-quadrant light-receiving region 140. For instance, the angles of the front focal line and rear focal line with respect to the orientation of the parting line of the four-quadrant light-receiving region 140 are adjusted to 45°, as illustrated in FIG. 10. The flat portion 128 and the holder 130 are in close contact with each other, and are bonded and fixed in that state. Reliability can be significantly enhanced thereby.

Figure 8:
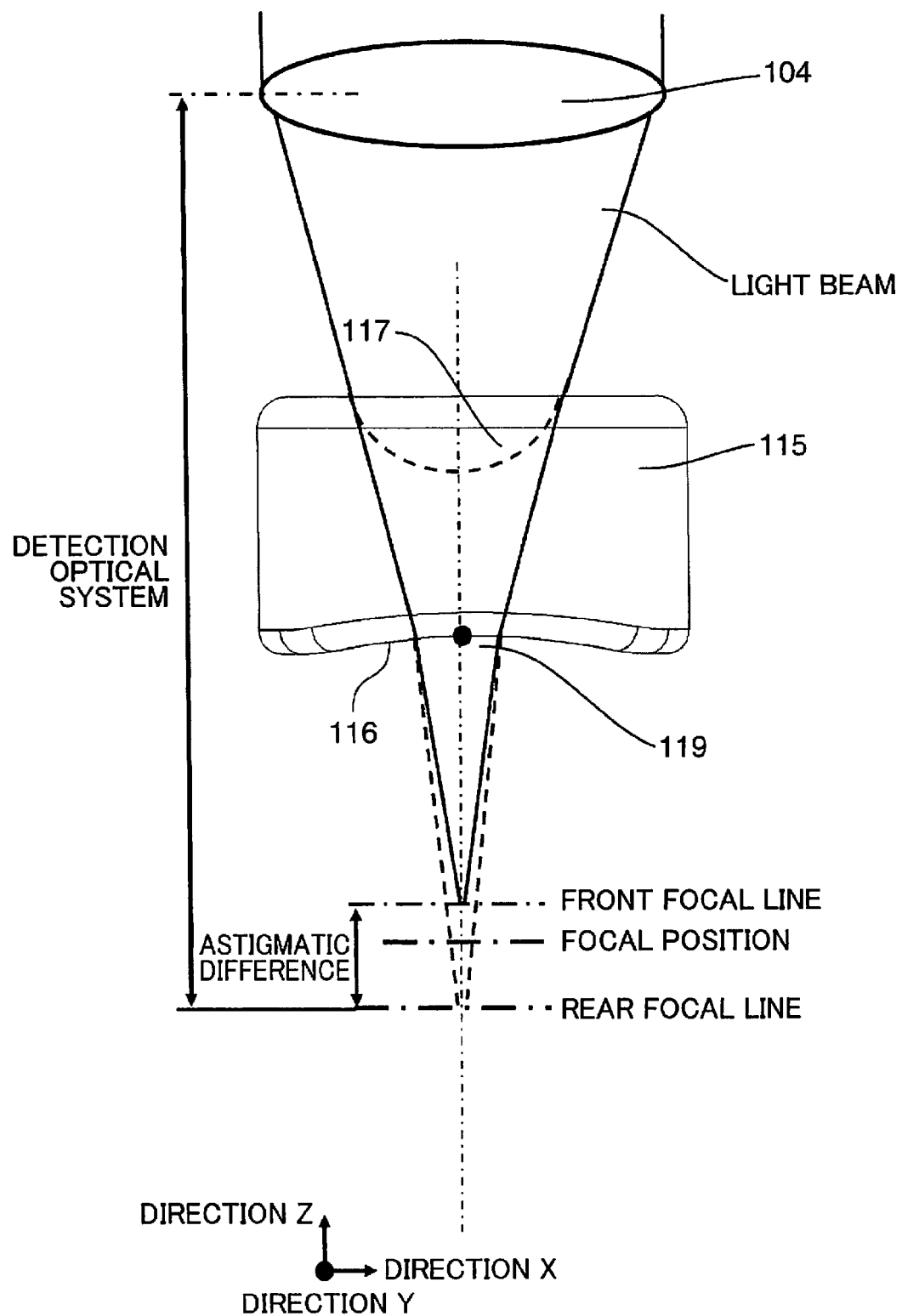
FIG. 8 is a diagram for explaining a beam of light that passes through the cylindrical lens in a case where the cylindrical lens is disposed in an orientation (cylindrical surface on the side of the light detector) inverted with respect to that in FIG. 7.
Figure 9A:
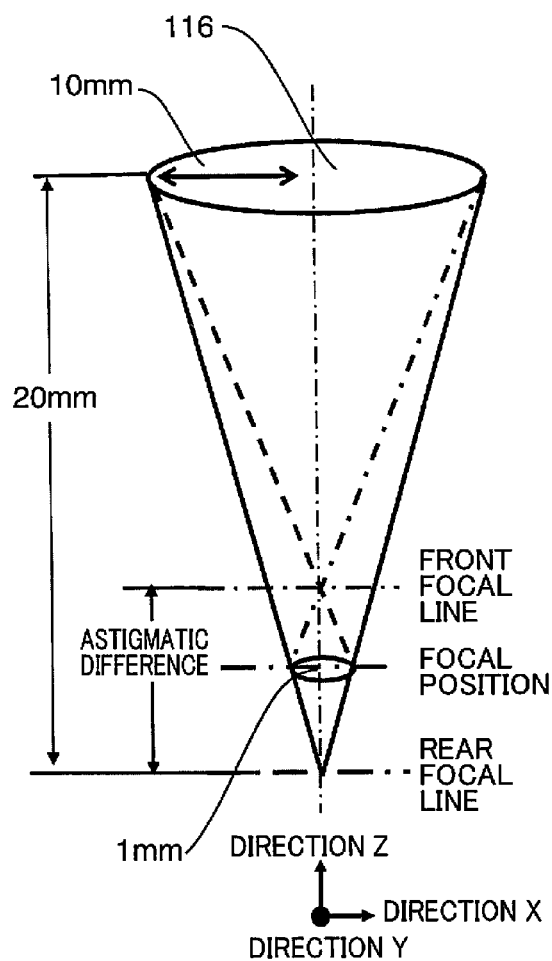
FIG. 9A is a diagram for explaining the positional relationship between the cylindrical surface and spot diameter at a focal position in the state of FIG. 7.
Figure 9B:
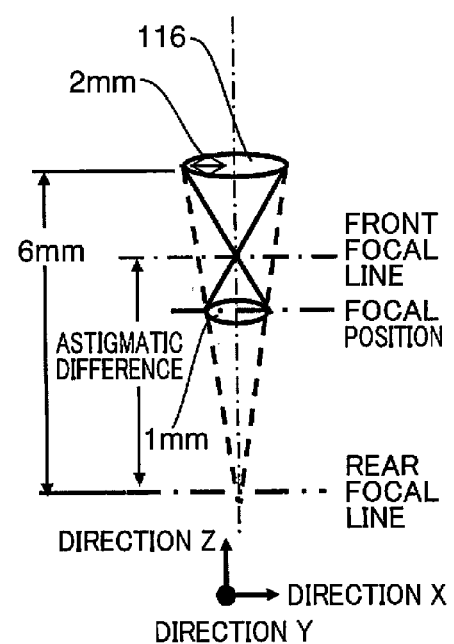
FIG. 9B is a diagram for explaining the positional relationship between the cylindrical surface and spot diameter at a focal position in the state of FIG. 8.

FIG. 8 illustrates the configuration of the cylindrical surface 116 of the cylindrical lens 155 disposed on the side of the light detector 120, for comparison vis-à-vis the configuration in FIG. 7. FIGS. 9A and 9B illustrate the relationship between the position of the front focal line, the position of the rear focal line and the position of the cylindrical surface 116 with respect to the focal position on the light detector 120 of FIG. 7 and FIG. 8. FIG. 9A illustrates a configuration, corresponding to FIG. 7, in which the cylindrical surface 116 and the focal position (light-receiving surface of the light detector 120) are spaced apart from each other. FIG. 9B illustrates a configuration, corresponding to FIG. 8, in which the cylindrical surface 116 is close to the focal position.

Figure 9C:
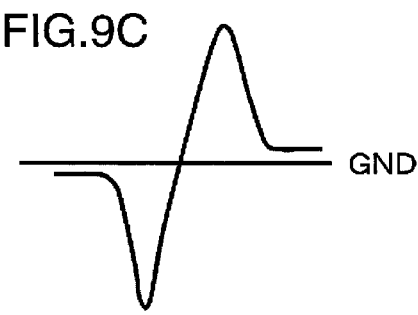
FIG. 9C is a diagram illustrating an example of focus error signal in the case of 9A.

In FIGS. 9A and 9B, the ratio of the distance between the focal position and the front focal line and the distance between the focal position and the rear focal line is 0.8:1 in a configuration in which the cylindrical surface 116 is disposed at the opposite side away from the light detector 120 (FIG. 9A), assuming a spot diameter (circle of least confusion) of the focal position of 1 mm. In the present embodiment there can be obtained a stable so-called focus error signal wherein an S-shaped signal exhibits good symmetry with respect to GND, despite the small size of the optical head (FIG. 9C).

Figure 9D:
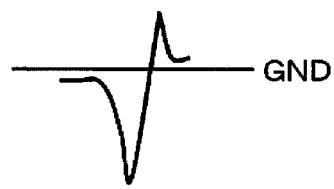
FIG. 9D is a diagram illustrating an example of focus error signal in the case of 9B.

By contrast, the ratio of the distance between the focal position and the front focal line and the distance between the focal position and the rear focal line is 1:3 in a configuration in which the cylindrical surface 116 is disposed on the side of the light detector 120 (FIG. 9B). In this case, the resulting focus error signal is an S-shaped signal having significantly worse symmetry with respect to GND (FIG. 9D). This translates into unstable focus servo. The astigmatic difference distance is about 20 to 30% greater in the configuration of FIG. 9B, where the cylindrical surface 116 is disposed on the side of the light detector 120, than the configuration of FIG. 9A, in which the cylindrical surface 116 is disposed at the opposite side away from the light detector 120. An S-shaped signal (focus error signal) securing a wide acquisition range can be achieved as a result in the configuration of FIG. 9A, which allows realizing stable focus servo.

In the configuration of the present embodiment, the flat surface 128 of the cylindrical lens 115 and the holder 130 are fixed by being bonded to each other while in a closely attached state in the detector unit 127 that comprises the cylindrical lens 115, the holder 130 and the light detector 120 integrally formed with each other. The foregoing are bonded to each other by way of the cylindrical lens bonding sections 134 where the cylindrical lens pressing section 138 and the flat surface 128 are in a closely attached state. This results in a small relative positional offset and relative angle offset between the cylindrical lens 115 and the holder 130, that are caused by adhesive swelling or shrinkage. The quality of the focus error signal can be made more stable as a result. The cylindrical surface 116, moreover, is disposed on the side of the incidence surface. The rotation of the cylindrical lens 115 can be adjusted therefore quickly and with high precision. An optical head 200 of superior performance can be realized as a result.

When the cylindrical surface 116 and the concave lens surface 117 are compared with each other, for a lens surface having a same given curvature, the cylindrical surface 116 is more difficult to form than the concave lens surface 117, in terms of molding and lens formation. The relative distance between the light-receiving surface 121 of the detector 120 and the cylindrical surface 116 can be lengthened by arranging the cylindrical surface 116 at the side of the incidence surface. Doing so allows reducing comparatively the lens power of the cylindrical surface 116, and makes molding and forming of the cylindrical surface 116 easier.

The characteristics of the surface of the holder 130 that abuts the light detector 120 will be explained briefly next. A characterizing feature of the present embodiment is the lower coefficient of friction within a predetermined area of the light detector pressing section 137, as the abutting surface that abuts the light detector 120 within the surface of the holder 130. This facilitates position adjustment of the light detector 120. Specifically, the surface roughness of the mold for forming the holder 130, at a portion corresponding to the predetermined area of the light detector pressing section 137, is smaller than the surface roughness of other portions. The surface at this portion is thus smoother. In the present embodiment, the light detector 120 is pressed against the light detector pressing section 137 of the holder 130, with the holding portions 132 of the holder 130 gripped by an external jig (not shown). The position of the light detector 120 within the X-Y plane is then adjusted in this state. The position of the light detector 120 can be adjusted precisely, with small displacements of 1 micron or less, by reducing the coefficient of friction of the surface that abuts the light detector 120, within the surface of the holder 130. Reducing the coefficient of friction to a greater degree at the portion that comes into contact with the light detector 120 is also advantageous in that the holder 130 can be formed thereby at a lower cost than in the case where the coefficient of friction is reduced all over the light detector pressing section 137 (also referred to as second main face). Herein, the surface that abuts the light detector 120 is highly likely to be a region that encompasses the central portion of the light detector pressing section of the holder 130 (also referred to as second main face), i.e. that encompasses the barycenter position. That is, reducing the surface roughness of a region that encompasses the barycenter allows eliciting the envisaged effect of enabling adjusting smoothly at least the flat surface.

Also, the coefficient of friction within a predetermined area of the cylindrical lens pressing section 138, which is the surface that abuts the cylindrical lens 115 within the surface of the holder 130, is reduced. This facilitates adjusting the position of the cylindrical lens 115. In the present embodiment, the cylindrical lens 115 is pressed against the cylindrical lens pressing section 138 of the holder 130, with the holding portions 132 of the holder 130 gripped by an external jig (not shown). The position of the cylindrical lens 115 within the X-Y plane is then adjusted in this state. The position of the cylindrical lens 115 can be adjusted precisely, with small displacements of 1 micron or less, by reducing the coefficient of friction of the surface that abuts the cylindrical lens 115, from within the surface of the holder 130. Reducing the coefficient of friction to a greater degree at the portion that comes into contact with the cylindrical lens 115 is also advantageous in that the holder 130 can be formed thereby at a lower cost than in the case where the coefficient of friction is reduced all over the cylindrical lens pressing section 138 (also referred to as first main face). Herein, the surface that abuts the cylindrical lens 115 is highly likely to be a region that encompasses the central portion of the cylindrical lens pressing section of the holder 130 (also referred to as first main face), i.e. that encompasses the barycenter position. That is, reducing the surface roughness of a region that encompasses the barycenter allows eliciting the envisaged effect of enabling adjusting smoothly at least the flat surface.

The surface roughness of the circular arc surface of the cylindrical lens positioning sections 136 may be set to be approximately the surface roughness of the cylindrical lens pressing section 138.

Conventional light detectors do not have to be positioned in a state where the light detector is abutting the holder. In the present embodiment, by contrast, positioning of the light detector 120 is adjusted in a state where the light detector 120 is abutting the holder 130. As a result, more precise positioning can be achieved by reducing the coefficient of friction of the holder surface vis-à-vis the coefficient of friction of the surrounding surface, at a predetermined area (for instance, at the region at which the holder 130 and the light detector 120 come into contact, and at a 300 micron area that constitutes a position adjustment area on the second main face) within the light detector pressing section 137 of the holder 130. In the present embodiment, the positioning of the cylindrical lens 115 is adjusted in a state where the cylindrical lens 115 is abutting the holder 130. As a result, more precise positioning can be achieved by reducing the coefficient of friction of the holder surface vis-à-vis the coefficient of friction of the surrounding surface, at a predetermined area (for instance, at the region at which the holder 130 and the cylindrical lens 115 come into contact, and at a 300 micron area that constitutes a position adjustment area on the first main face) within the cylindrical lens pressing section 138 of the holder 130.

In the present embodiment, at least part (light detector pressing section 137) of the second main face has a smaller surface roughness than the surface roughness at other portions. However, the embodiment is not limited thereto. For instance, the surface roughness over the entire second main face may be smaller than the surface roughness of a side face (face parallel to the optical axis) of the holder 130. In the present embodiment, at least part (cylindrical lens pressing section 138) of the first main face has a smaller surface roughness than the surface roughness at other portions. However, the embodiment is not limited thereto. For instance, the surface roughness over the entire first main face may be smaller than the surface roughness of a side face (face parallel to the optical axis) of the holder 130.

Figure 11:
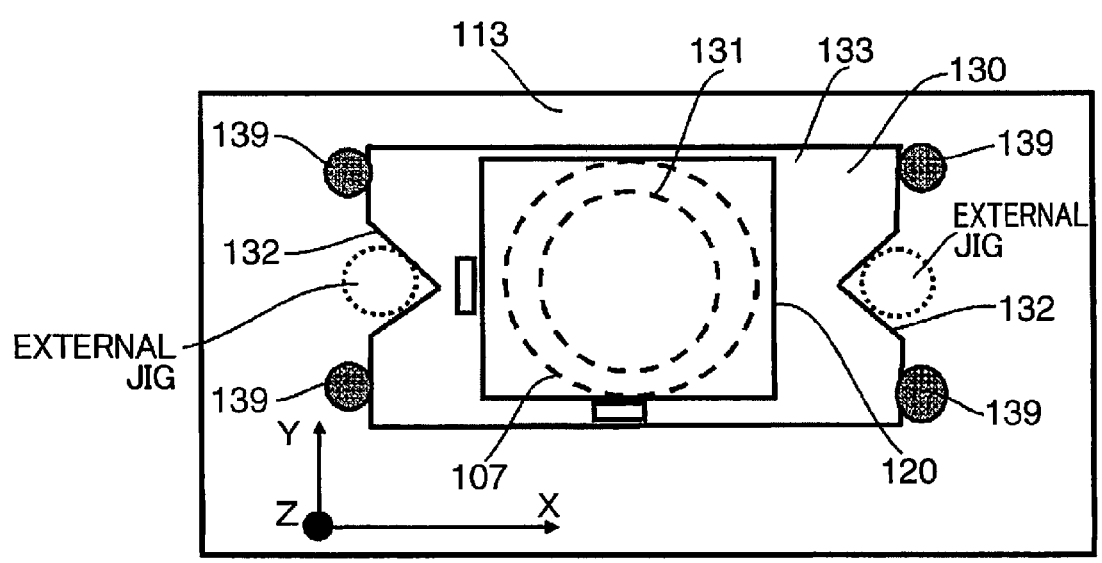
FIG. 11 is diagram for explaining a fixing method of the detector unit and an optical base in the optical head according to the first embodiment of the present invention.

FIG. 11 illustrates a method for fixing the detector unit 127 to the optical base 113.

After adjusting the position of the detector unit 127 in direction X, direction Y and direction Z, and the rotation of the detector unit 127 about the optical axis, an adhesive is coated onto the holder bonding sections 139, which are the bonding sections between the optical base 113 and the holder 130, and the detector unit 127 is fixed to the optical base 113.

In order to realize a small optical head that supports also recording and reproduction to/from multilayer optical disks, the detection optical system, which has the objective lens 105, the collimating lens 104 and the light detector 120, is required to have a greater lateral magnification, is required to be configured in such a manner that stray light reflected from other layers does not enter the sub-beam light-receiving regions, and is required to be small in size. Tracking error signal offset occurs when stray light reflected by other layers is incident on the sub-beam light-receiving regions. Tracking servo performance is significantly impaired thereby, which results in a loss of recording and reproduction performance.

It becomes necessary therefore to increase the size of the detection optical system of the optical head. On the other hand, large lens power is required to be achieved, by forming a lens surface having a small radius of curvature on the cylindrical lens, in order to reduce the size of the detection optical system.

Figures 12A, 12B:
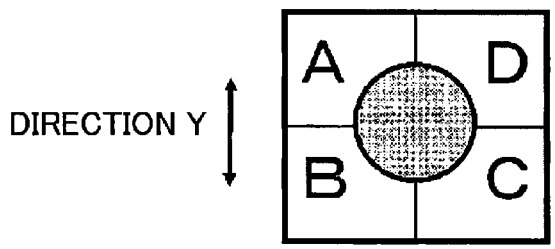
FIG. 12A is a diagram illustrating the relationship between spot positional offset and magnification in a detection optical system.
FIG. 12B is a diagram for explaining the definition of PD balance (direction Y).

FIG. 12A illustrates the relationship between the magnification (lateral magnification β) of the detection optical system and the radius of the concave lens portion (concave lens surface) of the cylindrical lens, and the approximate calculated value of sub-beam offset with respect to the main beam on the light detector. As used herein, the term detection optical system refers to the optical system along the path that a reflected light beam follows from the objective lens 105 up to the light detector 120, and that comprises the objective lens 105, the collimating lens 104 and the cylindrical lens 115. The lateral magnification denotes the ratio of focal length of the optical system that combines the collimating lens 104 and the cylindrical lens 115, with respect to the focal length of the objective lens 105. Sub-beam offset with respect to the main beam on the light detector 120 occurs on account of errors in the distance between the cylindrical lens 115 and the light detector 120.

In a case where the cylindrical lens and the light detector are configured spaced apart from each other, the offset of the distance between the cylindrical lens and the light detector is at most of about 300 μm, even after adjustment in the optical axis direction. FIG. 12A tabulates the results of a calculation of sub-beam spot positional offset for an offset of about 100 μm of the distance between the cylindrical lens and the light detector.

For an optical head of a given size, the radius of the concave lens portion decreases sharply accompanying greater magnification when, with a view to cope with multilayer optical disks, the magnification (lateral magnification) of the detection optical system exceeds 10 times, instead of 5 times to 10 times, as in conventional cases. The detection optical system becomes as a result more sensitive to positional offset between the cylindrical lens and the light detector, in the optical axis direction, and there increases sub-beam offset with respect to the main beam.

Conversion of sub-beam positional offset to PD balance is considered next. It is deemed that, ordinarily, tracking servo characteristics become significantly impaired for a 30% offset in PD balance, which exerts a non-negligible influence on reproduction and recording signal characteristics.

The definition of PD balance is explained next with reference to FIG. 12B, FIG. 7 and FIG. 10.

FIG. 7 is a diagram illustrating the relationship between the central generatrix 119 of the cylindrical surface of the cylindrical lens 115 and the four-quadrant light-receiving region 140. The cylindrical lens 115 gives rise to an astigmatic difference between mutually dissimilar focal positions. The astigmatic difference arises between the front focal line and the rear focal line that are at an angle of 90 degrees with respect to each other within the X-Y plane (within the plane perpendicular to the optical axis of the reflected light beam). The central generatrix 119 of the cylindrical surface in FIG. 7, which is set along a direction perpendicular to the paper, is disposed at an oblique angle of 45 degrees with respect to the parting lines of the four-quadrant light-receiving region 140 of the light detector 120 (FIG. 10).

The relative distance between the information layer 202 and the objective lens 105 varies due to, for instance, surface runout of the optical disk 201. Light is focused as a result at the front focal line and the rear focal line. The light-receiving surface 121 is disposed at the focal position in the figure. The magnification (lateral magnification β) of the detection optical system is determined by the focal length of the objective lens 105, the focal length of the collimating lens 104 and the optical power of the concave lens surface 117 of the cylindrical lens 115.

FIG. 10 illustrates the shape of the front focal line and rear focal line viewed from the optical axis direction, and the shape of a light beam on the four-quadrant light-receiving region 140. The focus error signal is calculated as (A+C)−(B+D), the PD balance (direction X) as ((A+B)−(C+D))/(A+B+C+D), and the PD balance (direction Y) as ((A+D)−(B+C))/(A+B+C+D), wherein A, B, C and D denote detection signals of respective light-receiving regions in the four-quadrant light-receiving region 140.

The position of the detector unit 127 is adjusted in direction X and direction Y in such a manner that PD balance (direction X) and PD balance (direction Y) approach 0.

Herein, a 1 μm sub-beam offset on the light detector corresponds to an offset of about 5% for sub-beam PD balance. Therefore, the sub-beam PD balance exhibits an offset of about 20% in a detection optical system where magnification is 16 times. The PD balance exhibits an offset of about 60% in a case where the distance between the cylindrical lens and the light detector is offset by 300 μm. Thus, an increase in the tracking error signal offset translates into a significant impairment of tracking servo performance.

It is therefore difficult to adjust the cylindrical lens and light detector separately in optical heads that are small and that comprise a high-magnification detection optical system.

In the present embodiment, by contrast, the positional offset of the cylindrical lens 115 and the light detector 120 in the Z axial direction can be reduced to be of about 5 μm up to 20 μm. Therefore, the PD balance is of about 4%, even in cases where a lens having 16 times detection magnification is used. This PD balance value is very low, as compared with that of conventional optical heads, and indicates that good reproduction signal characteristics can be preserved even when using an objective lens having high detection magnification. The lateral magnification in the first embodiment ranges preferably from 14 times to 16 times. The radius of curvature of the cylindrical surface may be equal to or smaller than 2.6 mm in the case of 14 times lateral magnification.

Figure 13A:
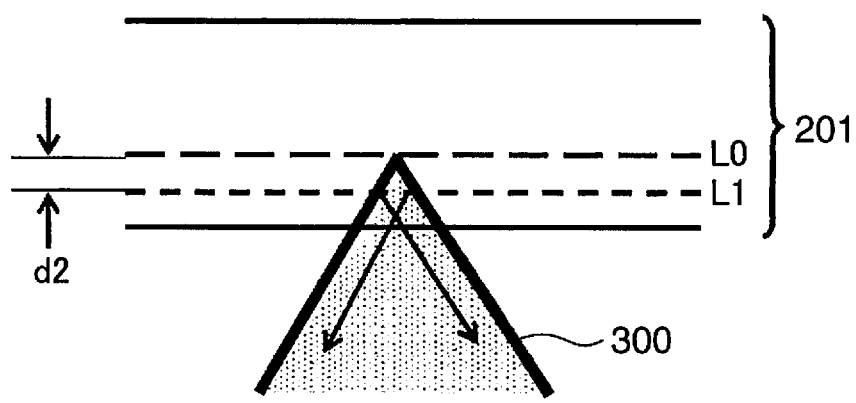
FIG. 13A is a diagram for explaining a beam of light that is incident on a recording layer in a two-layer disk.
Figure 13B:
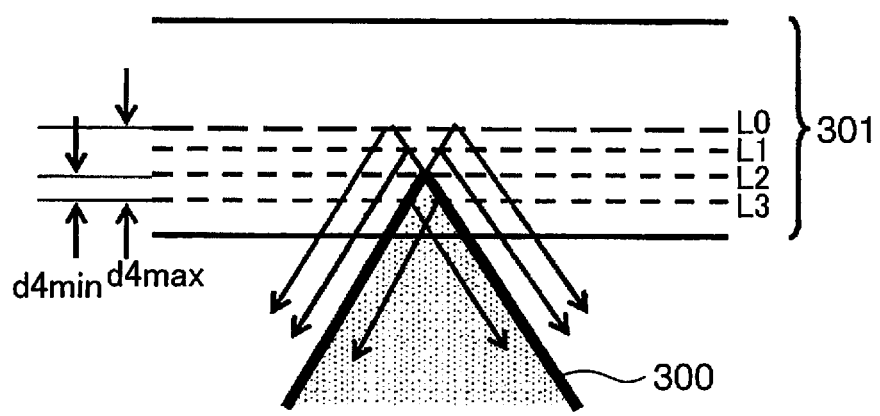
FIG. 13B is a diagram for explaining a beam of light that is incident on a recording layer in a multilayer disk (four-layer disk).

FIG. 13A illustrates schematically an instance of surface reflection from another recording layer in a two-layer optical disk 201. FIG. 13B illustrates schematically an instance of surface reflection from another recording layer in a multilayer optical disk 301. Reflected light from these other layers is incident on the sub-beam light-receiving regions 141 and introduces offset in the tracking error signal, impairing as a result the quality of tracking servo. FIG. 13A illustrates an instance of stray light from another recording layer when converging light 300 is focused on a given recording layer in a case where the optical disk 201 is a two-layer disk. Upon focusing onto layer L0 (recording layer), light reflected by layer L1 (recording layer) becomes other-layer stray light.

FIG. 13B illustrates an instance of stray light from another recording layer when converging light 300 is focused on a given recording layer in a case where the optical disk 301 is a four-layer disk. In FIG. 13B, light is focused onto layer L2 (recording layer), and light reflected by layer L0, layer L1 and layer L3 (recording layer) becomes other-layer stray light. The standard spacing d2 between layer L0 and layer L1 in the case of the two-layer disk illustrated in FIG. 13A is 25±5 μm, i.e. minimum 20 μm and maximum 30 μm. As a result, the amount of other-layer stray light on the light detector 120 can be limited to certain extent. In the case of an optical disk having three or more layers, for instance the four-layer disk illustrated in FIG. 13B, it is very likely that the layer spacing d4min, which is the smallest layer spacing (in the figure, for instance, layer spacing between layer L2 and layer L3) is smaller than that in the case of a two-layer optical disk. For the layer spacing d4max between the layers that are most spaced apart from each other (in the example of the figure, the layer spacing between layer L0 and layer L3), the amount of other-layer stray light that is incident on the light detector 120 is significantly greater than that in the case of a two-layer optical disk. Therefore, in order to detect a stable tracking error signal, and support recording and reproduction to/from multilayer optical disks, it is necessary to increase the magnification (lateral magnification β) of the detection optical system in such a manner that other-layer stray light does not leak onto the sub-beam light-receiving regions 141, and it is necessary to widen the distance between the four-quadrant light-receiving region 140 that receives the main beam 142 and the sub-beam light-receiving regions 141 that receive the sub-beams 143.

Figure 14A:
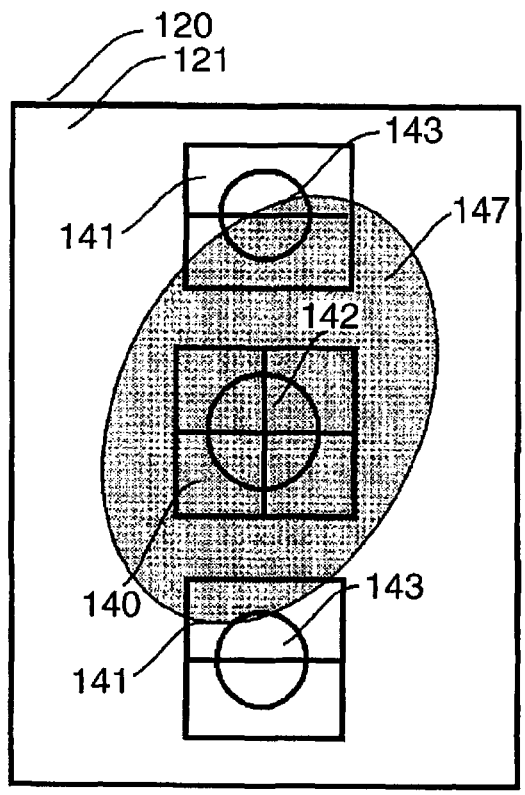
FIG. 14A is a diagram for explaining other-layer stray light that is incident on a light detector, as a comparative example.
Figure 14B:
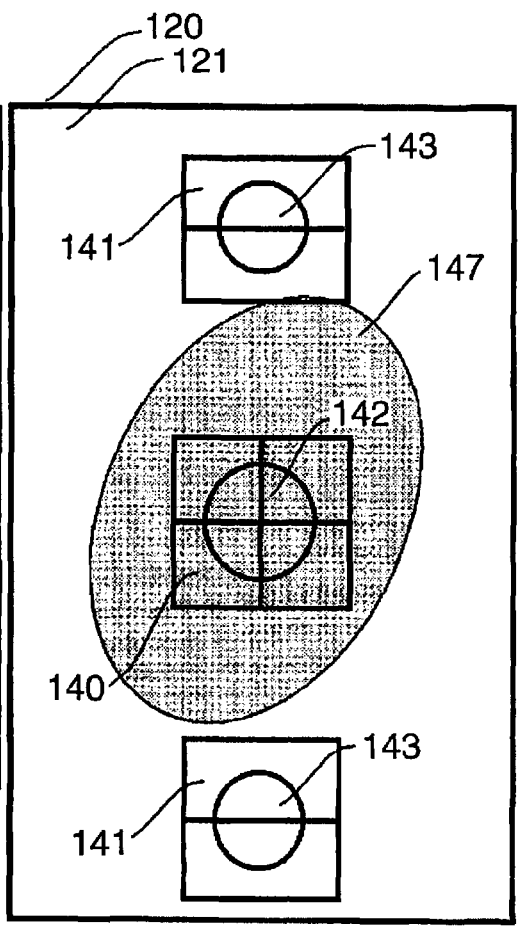
FIG. 14B is a diagram for explaining other-layer stray light that is incident on the light detector provided in the optical head in the first embodiment of the present invention.

FIGS. 14A and 14B illustrate the relationship between the size of other-layer stray light 147 and the distance between the sub-beams 143 and the main beam 142 on the light detector 120. The distance between the main beam 142 and the sub-beams 143 on the light detector 120 is a value resulting from multiplying the gap between the sub-beams and the main beam, which is condensed onto the information recording layer 202 (FIG. 1), by the lateral magnification of the detection optical system. For instance, the distance between the main beam 142 and the sub-beams 143 on the light detector 120 is of about 120 μm when a gap between the main beam and the sub-beams on a track of the information recording layer 202 is 20 μm and the lateral magnification of the detection optical system is about 6 times. To detect stable tracking error signals in order to support recording and reproduction to/from multilayer optical disks, however, the size of other-layer stray light is required to be about 150 μm, and the lateral magnification of the detection optical system about 10 times. The distance between the main beam 142 and the sub-beams 143 is about 200 μm in this case. The spacing between the main beam and the sub-beams on the track of the information layer 202 is about 20 μm. This value, which affects the tracking error offset upon movement from the inner periphery towards the outer periphery of the optical disk 201, is set beforehand in each device. The selected value ranges ordinarily from 10 μm to 20 μm.

The dimensions of the detection optical system are required to be reduced in order to realize a smaller optical head 200. The detection optical system is required to also be made smaller, with the influence of the other-layer stray light in mind. The influence of other-layer stray light mandates a greater magnification in the detection optical system. For a given lateral magnification, however, the focal length of the objective lens 105 becomes smaller when the size of the detection optical system is reduced only at the objective lens 105 and the collimating lens 104. The working distance between the objective lens 105 and the surface of the optical disk 201 becomes shorter as a result. Therefore, reducing the size of the detection optical system is difficult to realize on account of the problem of focus servo difficulties that doing so entails. However, lateral magnification can be increased without modifying the focal length of the objective lens 105, and the dimensions of the detection optical system can be made smaller, by arranging the concave lens surface 117 on the side of the exit surface of the cylindrical lens 115, as described above.

In order to increase the distance between the four-quadrant light-receiving region 140 and the sub-beam light-receiving regions 141, the lateral magnification of the detection optical system comprising the objective lens 105, the collimating lens 104, and the concave lens 117 of the cylindrical lens 115, is preferably set to range from about 10 times to 20 times.

With increased lateral magnification, the dimensions of detection optical system is required to then be reduced in order to realize a small optical head 200. A lens having a very large lens power, with a radius of curvature of about 5 mm to 1 mm (equal to or greater than 1 mm and equal to or smaller than 5 mm) is required to be used as the concave lens 117 of the cylindrical lens 115.

The lateral magnification of the detection optical system varies greatly, on account of the relative distance error between the cylindrical lens 115 and the light-receiving surface 121 of the light detector 120, in a configuration where the magnification in the detection optical system is increased and the cylindrical lens 115 has a substantial lens effect. Accordingly, there increases the likelihood that the sub-beams 143 necessary for generating the tracking error signal are incident at positions off the sub-beam light-receiving regions 141. For instance, the lateral magnification of the detection optical system is reduced, and the sub-beams 143 are incident on nearer the four-quadrant light-receiving region 140, when the distance between the cylindrical lens 115 and the light detector 120 is shorter than a predetermined distance. Conversely, the lateral magnification of the detection optical system increases, and the sub-beams 143 strike outside the sub-beam light-receiving regions 141, when the distance between the cylindrical lens 115 and the light detector 120 is longer than a predetermined distance.

In a detection optical system having a lateral magnification equal to or greater than 10 times, the change in lateral magnification is equal to or greater than about 0.7% when the relative distance error between the cylindrical lens 115 and the light detector 120 exceeds 50 μm. That is, the sub-beams 143 shift by several μm in direction Y, and the change in tracking error signal offset exceeds about 10%. Tracking servo performance becomes significantly impaired as a result. In a detection optical system having large lateral magnification, therefore, it is necessary to reduce the relative distance error between the cylindrical lens 115 and the light detector 120 to be significantly smaller than 50 μm.

In the optical head 200 of the present embodiment, the light detector 120 and the cylindrical lens 115 can be positioned beforehand on the holder 130, with good precision, upon adjustment of the position of the detector unit 127. Therefore, the relative position error between the cylindrical lens 115 and the light detector 120 with respect to the holder 130 can be reduced significantly upon adjustment of the position of the light detector 120 within the X-Y plane, on the optical base 113, and upon adjustment of the position of the cylindrical lens 115 in direction Z (optical axis direction). Error in the lateral magnification of the detection optical system and deterioration of the tracking error signal can both the significantly reduced as a result.

In the optical head 200 of the present embodiment the cylindrical lens 115 and the light detector 120 are integrated together, and hence the positional error of the cylindrical lens 115 with respect to the light detector 120 in direction Z arises only from dimensional errors in the holder 130. This dimensional error can be kept within a range of 5 to 20 μm, and hence the positional error between the cylindrical lens 115 and the light detector 120 in direction Z can be reduced to be no greater than 50 μm. The relative positional error of the cylindrical lens 115 with respect to the light detector 120 in direction X and direction Y can also be kept no greater than 50 μm. As a result, it becomes thus possible to use an optical head 200 having large lateral magnification, and to realize a small high-performance optical head 200, also for a multilayer optical disk 301.

The cylindrical lens 115 and the light detector 120 are fixed beforehand to the holder 130 in the detector unit 127. As a result, the position of the detector unit 127 itself can be adjusted within the X-Y plane, on the optical base 113, and can be adjusted also in the optical axis direction (direction Z). Changes in the lateral magnification of the detection optical system can be reduced thereby. As a result there can be realized an optical head 200 having excellent reliability and that can perform stable recording and reproduction with little offset fluctuation in tracking error signal.

Figure 15A:
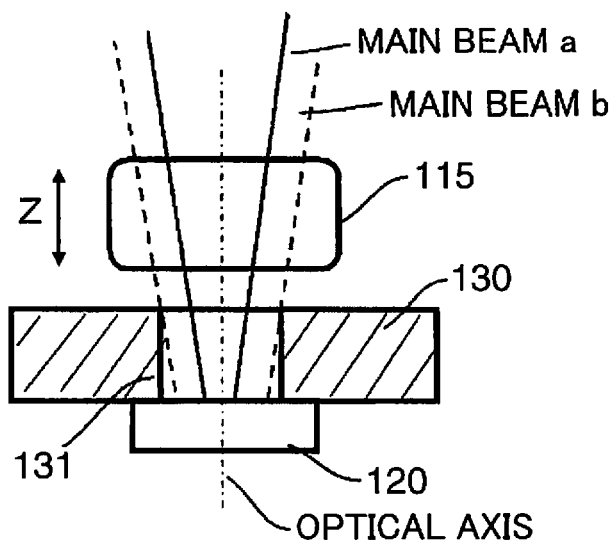
FIG. 15A is a diagram for explaining an aperture diameter during adjustment of the cylindrical lens in direction Z, in a comparative example.
Figure 15B:
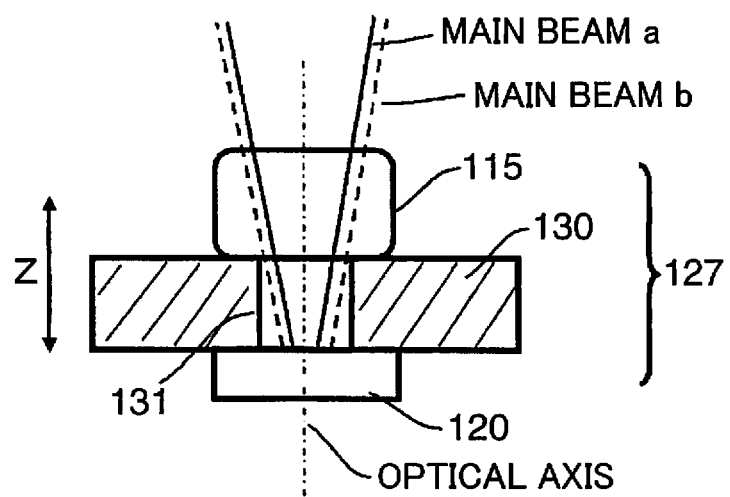
FIG. 15B is a diagram for explaining the aperture diameter during adjustment, in direction Z, of the detector unit in the optical head according to the first embodiment of the present invention.

FIGS. 15A and 15B illustrate the influence of the diameter of the aperture 131 during adjustment in direction Z. Also in a configuration where the aperture 131, the cylindrical lens 115 and the light detector 120 are integrated together, a wider opening diameter of the aperture 131 is preferable on account of the associated greater error tolerance during adjustment of the aperture 131, the cylindrical lens 115 and the light detector 120. A detection optical system having a magnification equal to or greater than 10 times is used in order to enable recording and reproduction to/from the multilayer optical disk 301 when integrating the aperture 131, the cylindrical lens 115 and the light detector 120, as in the present embodiment. During recording and reproduction in such a multilayer optical disk 301, reflected light (other-layer stray light) from information recording layers other than the target layer for recording or reproduction is also incident, which affects significantly the quality of the reproduction signal. This multilayer stray light is required to be therefore cut off. Such being the case, the surface area of the aperture 131 is required to be made smaller.

The adjustment amount of the light detector 120 cannot be prevented from introducing an error in the relative position between the aperture 131 and the cylindrical lens 115 in an optical head where the cylindrical lens 115 is spaced apart from the aperture 131 and the light detector 120 but where the aperture 131 and the light detector 120 are integrated together. Therefore, at least a dimensional allowance is required in the opening diameter, the allowance being equal to or greater than the adjustment amount (ordinarily, from about 0.05 mm to 1 mm) within a plane perpendicular to the optical axis of the light detector 120. In the present embodiment, by contrast, the aperture 131, the cylindrical lens 115 and the light detector 120 are all integrated together, and hence the opening diameter of the aperture 131 can be made smaller.

FIG. 15A illustrates an optical head in a comparative example. In this case, the relative position between the holder 130 and the cylindrical lens 115 varies through adjustment of the cylindrical lens 115 in the front-rear direction (direction Z). Therefore, the diameter of a light beam passing through the aperture 131 varies significantly between a main beam a and a main beam b. The diameter of the aperture 131 is required to be increased as a result, which is accompanied by a significant increase in the amount of stray light that strikes the sub-beam light-receiving regions 141 of the light detector 120.

In the optical head 200 of the present embodiment illustrated in FIG. 15B, by contrast, the detector unit 127 is integrally adjusted in direction Z. Therefore, the relative distance between the cylindrical lens 115 and the holder 130 does not change, and hence the diameter of the light beams that pass through the aperture 131 remains virtually unchanged. The diameter of the aperture 131 can be therefore reduced to the utmost, and the amount of stray light striking the sub-beam light-receiving regions 141 of the light detector 120 can be reduced significantly.

Figure 16A:
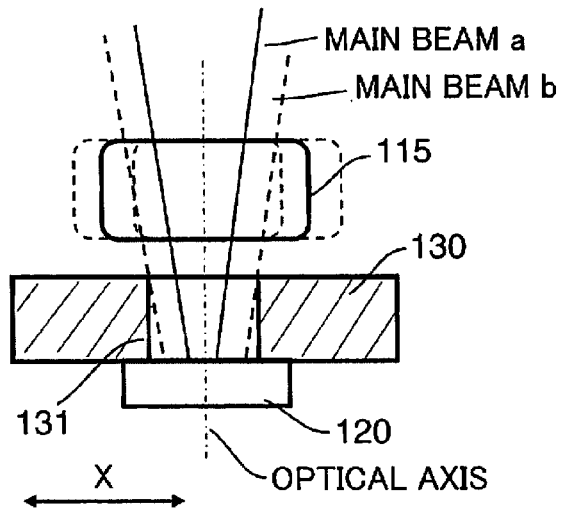
FIG. 16A is a diagram for explaining an aperture diameter during adjustment of the cylindrical lens in direction X, in a comparative example.

The difference in the diameter of the aperture 131 during adjustment in direction X will be explained next with reference to FIGS. 16A and 16B. FIG. 16A illustrates an optical head in a comparative example. In this optical head, the relative position relationship between the cylindrical lens 115 and the holder 130 is modified by adjusting the light detector 120 to the left and right (direction X). Therefore, the diameter of a light beam passing through the aperture 131 varies significantly between a main beam a and a main beam b. The diameter of the aperture 131 is required to be increased as a result, which is accompanied by a significant increase in the amount of stray light that strikes the sub-beam light-receiving regions 141 of the light detector 120.

Figure 16B:
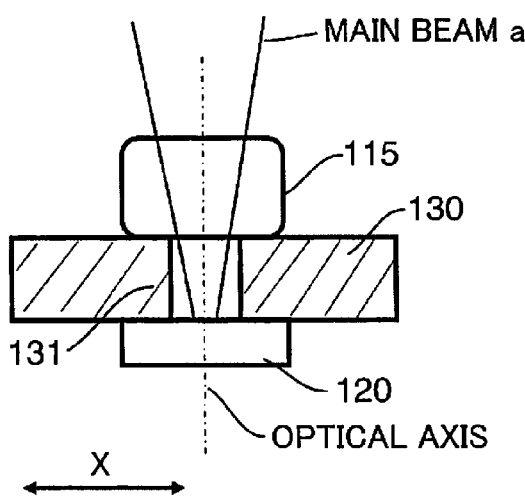
FIG. 16B is a diagram for explaining the aperture diameter during adjustment, in direction X, of the cylindrical lens in the optical head according to the first embodiment of the present invention.

In the optical head 200 of the present embodiment illustrated in FIG. 16B, by contrast, the detector unit 127 moves as a single body in direction X. Accordingly, the relative distance between the cylindrical lens 115 and the holder 130 does not change, and thus the diameter of the light beam that passes through the aperture 131 remains virtually unchanged. The diameter of the aperture 131 can be therefore reduced to the utmost, and the amount of stray light striking the sub-beam light-receiving regions 141 of the light detector 120 can be reduced significantly.

Figure 16C:
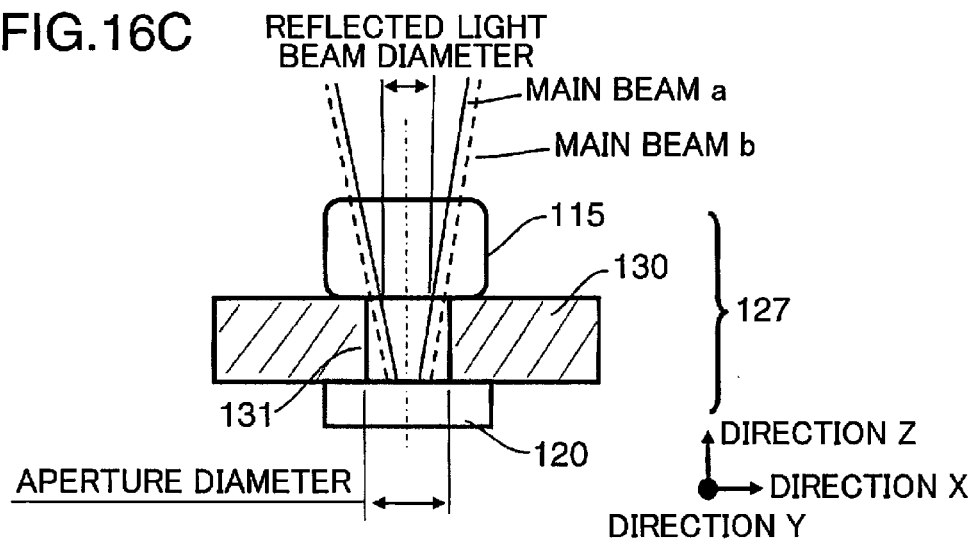
FIG. 16C is a diagram for explaining the aperture diameter in the optical head according to the first embodiment of the present invention.

An explanation follows next, with reference to FIG. 16C on the relationship between the dimensions of the aperture 131 with respect to the dimensions of the main beam a in the optical head of the present embodiment.

The aperture diameter can be equated to the sum of the diameter of the reflected light beam, the positional offset amount, in direction X (or direction Y), of the cylindrical lens 115 with respect to the aperture 131 of the holder 130, the positional offset amount, in direction X (or direction Y), of the light detector 120 with respect to the aperture 131 of the holder 130, and the increase in the reflected light beam diameter at the position of the aperture 131 that results from adjusting the position of the light detector unit 127 in direction Z. That is, the adjustment dimensions (about 0.05 mm to 1 mm) of the light detector unit 127 in direction X (or direction Y) can be excluded, and hence the aperture diameter can be reduced significantly.

Figure 17:
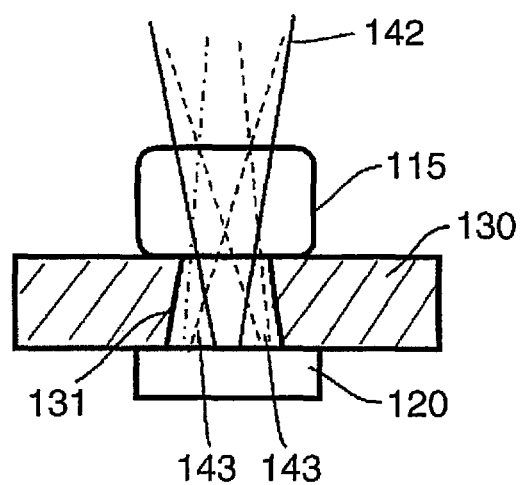
FIG. 17 is a diagram illustrating schematically aperture shape in a modification of the optical head according to the first embodiment of the present invention.

In the present example, the aperture 131 is shaped as a cylindrical hole, but may also be shaped as a conical hole, as illustrated in FIG. 17. Such a configuration allows further reducing the aperture diameter in conceivable cases where sub-beams 143 strike obliquely.

Needless to say, the emission wavelength of the semiconductor laser 1, as the light source in the first embodiment, may suitable be of about 780 nm for CDs, of about 650 nm for DVDs, or of about 405 nm for BDs.

Figure 18:
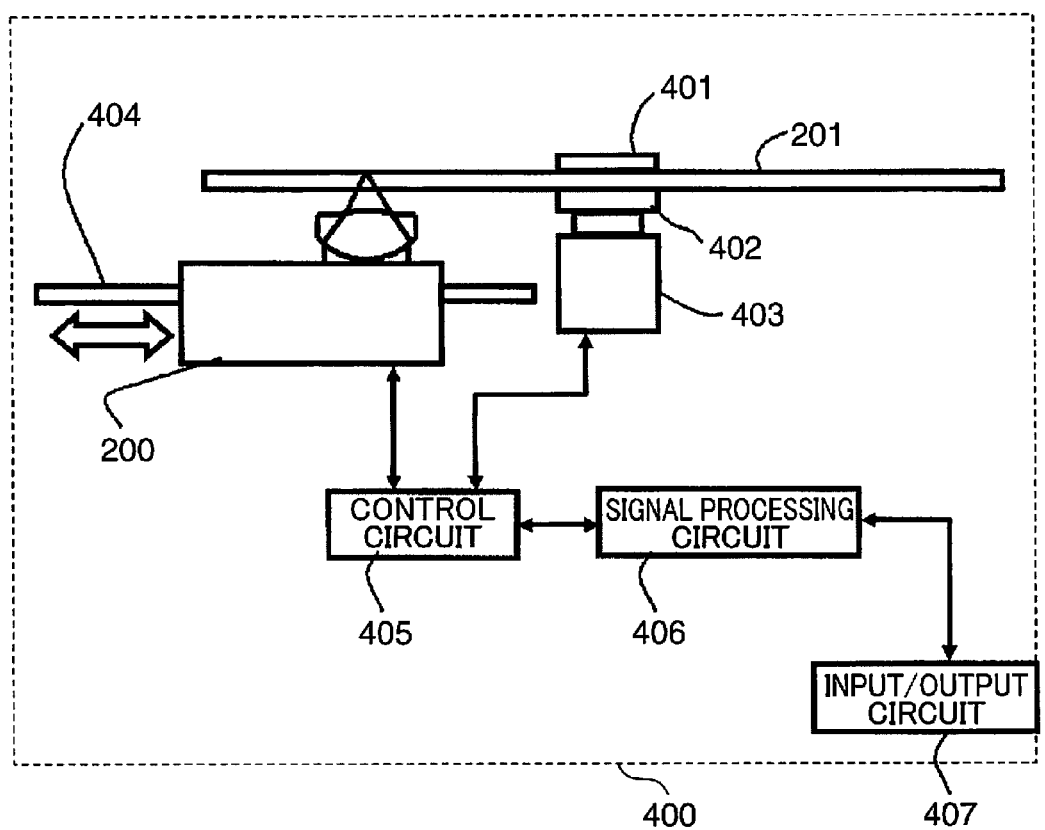
FIG. 18 is a diagram illustrating schematically an optical disk drive in an optical information device that uses the optical head according to the first embodiment of the present invention.

FIG. 18 illustrates an example of the configuration of an optical disk drive 400 as an optical information device where the above optical head 200 is used. The optical disk 201 is fixed between a clamper 401 and a turntable 402, and is caused to rotate in that state by a motor (rotation system) 403. The optical head 200 rests on a traverse (transport system) 404, such that the point struck by light can shift from the inner periphery of the optical disk 201 towards the outer periphery thereof. On the basis of signals received from the optical head 200, the control circuit 405 performs, for instance, focus control, tracking control, traverse control as well as control of the rotation of the motor 403. A signal processing circuit 406 reproduces information on the basis of a reproduction signal, and outputs the result to an input/output circuit 407. The signal processing circuit 406 also sends signals coming from the input/output circuit 407 to the optical head 200, via the control circuit 405.

The present embodiment affords a more distinctive effect through the use of an optical head 200 having a cylindrical lens 115 of high concave lens power, and having a large-magnification detection optical system. The cylindrical surface 116 of the cylindrical lens 115 is disposed at the opposite side away from the light detector 120. The servo signal performance can be further enhanced thereby. The present invention, however, can be used irrespective of the magnitude of the lens power of the cylindrical lens, and can be used in other optical heads, without restrictions. In those cases as well, the present invention allows reducing the relative positional error between a cylindrical lens and a light detector.

The cylindrical lens 115 in the present embodiment is made up of a glass material, and is bonded to the holder 130 that is made up of a metal such as zinc, aluminum or the like. However, the cylindrical lens 115 and the holder 130 may both be made up of a resin. Also, the cylindrical lens 115 and the holder 130 may be made up of resin and be formed integrally with each other.

Embodiment 2

An optical head according to a second embodiment of the present invention will be explained next.

Figure 19A:
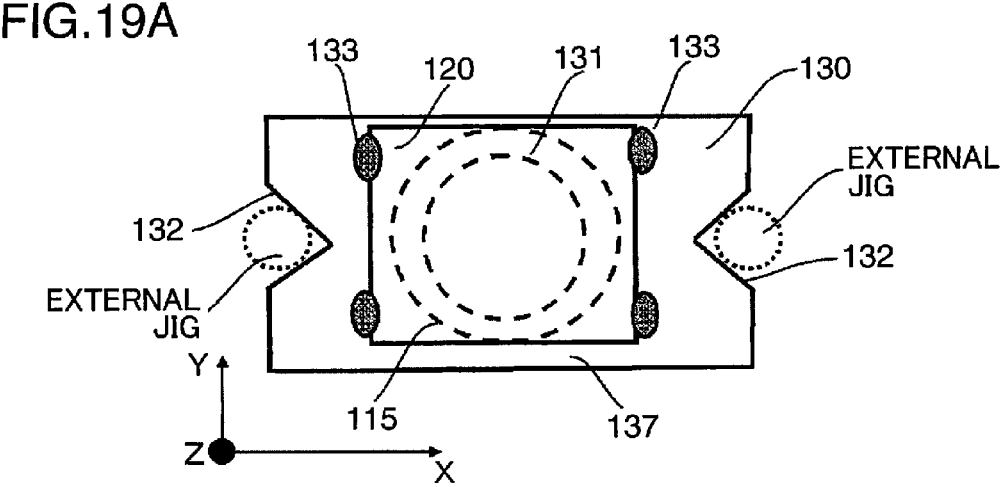
FIG. 19A is a side-view diagram illustrating schematically a detector unit in an optical head according to a second embodiment of the present invention.
Figure 19B:
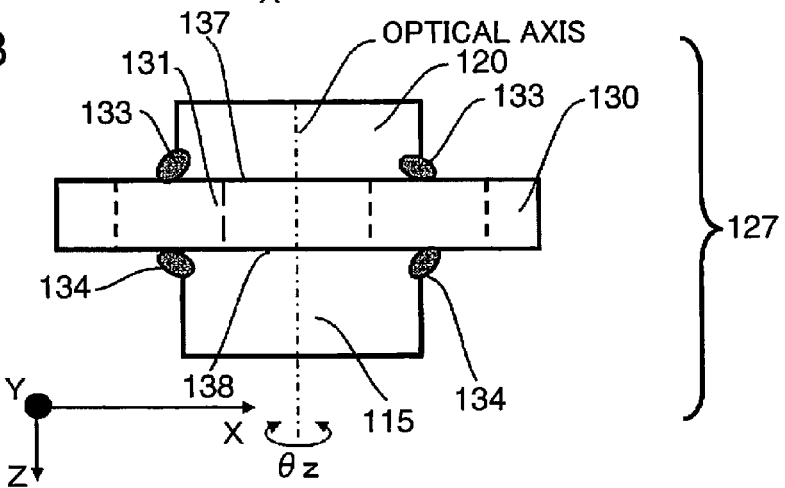
FIG. 19B is a front-view diagram illustrating schematically the detector unit.
Figure 19C:
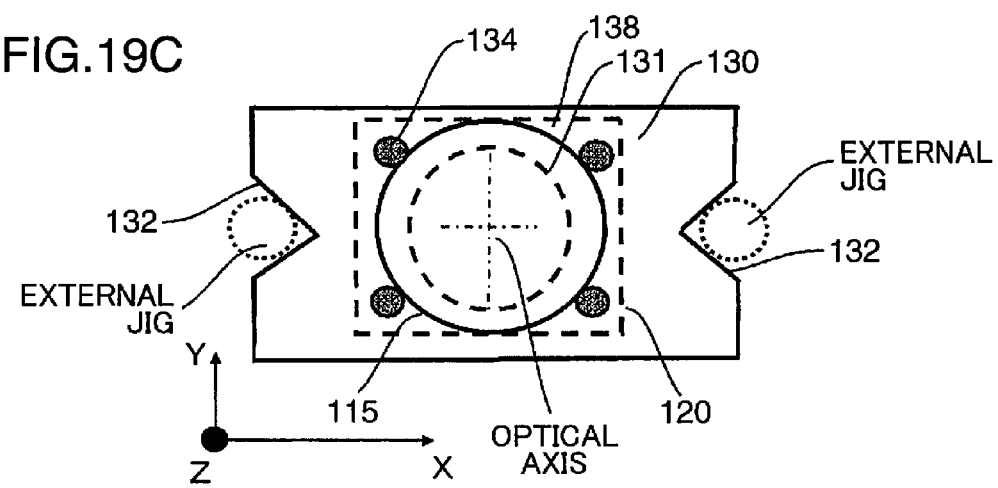
FIG. 19C is another side-view diagram illustrating schematically the detector unit.

FIGS. 19A to 19C illustrate the detector unit 127 provided in the second embodiment and illustrate the relationship between the light detector 120, the cylindrical lens 115, the holder 130 and the aperture 131.

The detector unit 127 of the present embodiment lacks the light detector positioning sections 135 and the cylindrical lens positioning sections 136. The holder 130 of the detector unit 127 has the aperture 131, the holding portions 132, the light detector pressing section 137, the cylindrical lens pressing section 138, the light detector bonding sections 133 and the cylindrical lens bonding sections 134. In the detector unit 127 there is adjusted the relative position relationship between the aperture 131 and the light detector 120, as well as the relative position relationship between the aperture 131 and the cylindrical lens 115. In the above adjustments, the position of the light-receiving surface 121 of the light detector 120 is adjusted, in direction X and direction Y, with respect to the aperture 131 and the holding portions 132 of the holder 130, in the X-Y plane, and also the angle θz about the optical axis is adjusted. The holder 130 is fixed thereafter. The light detector 120 can be positioned thereby, with good precision, with respect to the holder 130.

The position of the cylindrical lens 115 is adjusted with respect to the holder 130 or the aperture 131, in such a manner that the outer shape of the cylindrical lens 115 or the lens optical axis 118 of the cylindrical lens 115 coincides with the center of the aperture 131. The position is adjusted by adjusting the position in direction X and direction Y within the X-Y plane. The angle θz of the cylindrical lens 115 about the optical axis is also adjusted. This is done by rotating the cylindrical lens 115 about the optical axis in such a manner that the central generatrix 119 of the cylindrical surface 116 adopts a predetermined orientation.

In the detector unit 127, the above configuration allows positioning and fixing, with good precision, the cylindrical lens 115, the aperture 131 and the light-receiving surface 121 of the light detector 120. The inner diameter of the aperture 131 can be reduced thereby to the essential minimum. Other-layer stray light coming from the multilayer recording medium and that strikes the light-receiving surface 121 of the light detector 120 can be better blocked as a result. Also, the optical head 200 can be made thinner, since the shape of the holder 130 can be made smaller.

In the present embodiment, the position of the cylindrical lens 115 in the Z axial direction is adjusted by pressing the cylindrical lens 115 against the cylindrical lens pressing section 138, after which the cylindrical lens 115 is bonded and fixed to the holder 130 at the cylindrical lens bonding sections 134. The embodiment, however, is not limited thereto, and the position of the cylindrical lens 115 in the Z axial direction may be adjusted, without pressing the cylindrical lens 115 against the cylindrical lens pressing section 138. The cylindrical lens 115 is then bonded and fixed to the holder 130 at the cylindrical lens bonding sections 134.

Embodiment 3

An optical head according to a third embodiment of the present invention will be explained next.

Figure 20A:
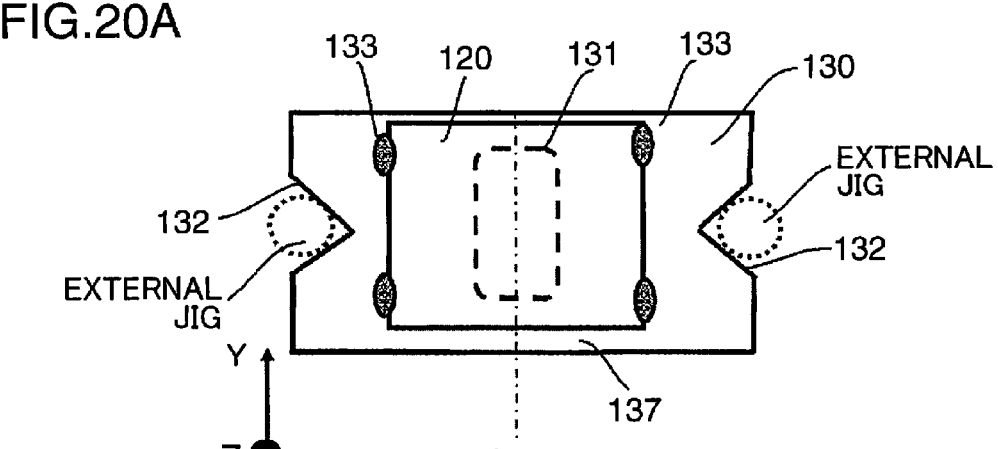
FIG. 20A is a side-view diagram illustrating schematically a detector unit in an optical head according to a third embodiment of the present invention.
Figure 20B:
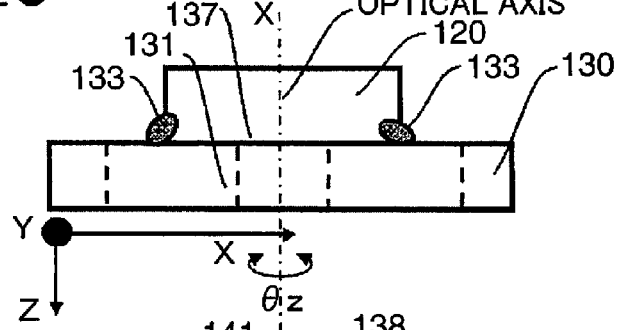
FIG. 20B is a front-view diagram illustrating schematically the detector unit.
Figure 20C:
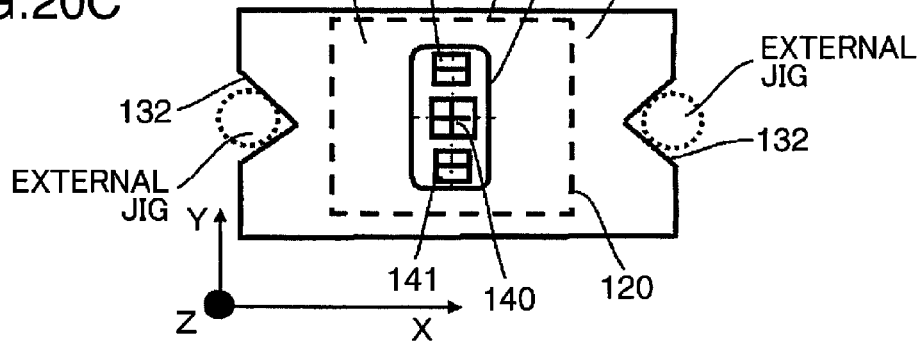
FIG. 20C is another side-view diagram illustrating schematically the detector unit.

FIGS. 20A to 20C illustrate the configuration of the detector unit 127 provided in the third embodiment. The figure illustrates the light detector 120, the cylindrical lens 115, the holder 130, the aperture 131, the four-quadrant light-receiving region 140 and sub-beam light-receiving regions 141.

The third embodiment differs from the first embodiment in that herein the shape of the aperture 131 is not cylindrical, but non-cylindrical. The four-quadrant light-receiving region 140 and sub-beam light-receiving regions 141 are disposed on the light-receiving surface 121 of the light detector 120 in such a way as to be arrayed in one direction, and the aperture 131 is shaped in such a manner that the cross-sectional shape thereof extends in that direction as a non-cylindrical shape. The non-cylindrical shape of the aperture allows reducing the amount of other-layer stray light that strikes the light-receiving surface 121, and allows realizing yet more stable focus servo and tracking servo.

Figure 20D:
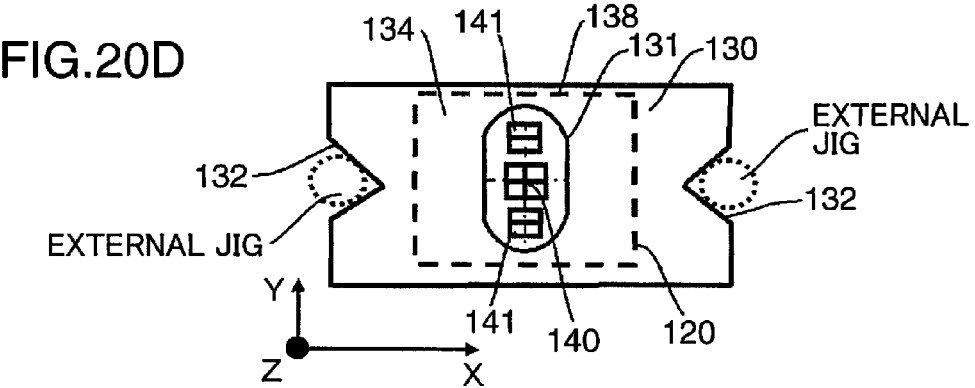
FIG. 20D is a side-view diagram illustrating schematically a modification of the detector unit.

The aperture 131 in the third embodiment is shaped as a rectangle, but may also be shaped as long hole whose peripheral face is shaped in part as a circular arc, or may be shaped as an oval or the like, as shown in FIG. 20D.

Embodiment 4

An optical head 200 according to a fourth embodiment of the present invention will be explained next.

The shape and arrangement of the aperture 131 in the fourth embodiment are different from those in the first to third embodiments.

Figure 21A:
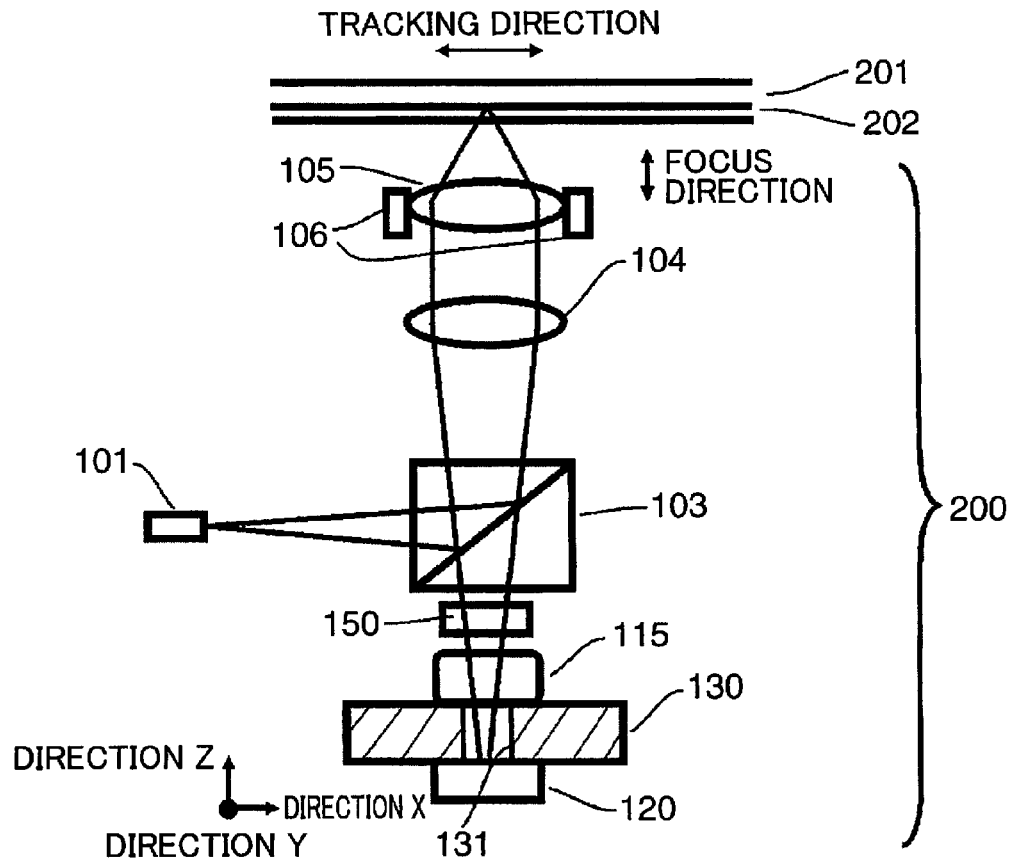
FIG. 21A is a diagram illustrating schematically an optical system of an optical head in a fourth embodiment of the present invention.

FIG. 21A illustrates the configuration of an optical system of an optical head 200 according to the fourth embodiment. The semiconductor laser 101 emits a light beam having an emission wavelength of about 405 nm. In this optical system, a hologram element 150 is disposed between the beam splitter 103 and the cylindrical lens 115. The optical head generates a tracking error signal by a one-beam method (APP method).

Figure 21B:
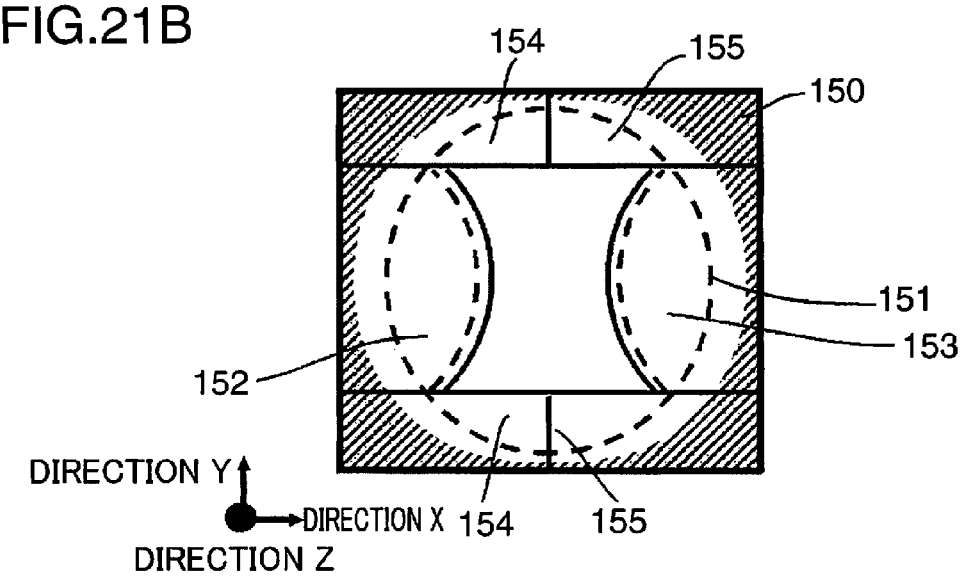
FIG. 21B is a diagram for explaining a region split in a hologram element provided in the optical system.

FIG. 21B illustrates the configuration of the hologram element 150. The solid line in the figure denotes a split pattern of the hologram element 150, and the broken line indicates the cross-sectional shape of a light beam that traverses the hologram element 150. The hologram element 150 has a main beam region 151; APP main regions 152, 153 onto which there strike interference light in the form of ±1 order light and 0 order light, diffracted by the information recording layer 202; and APP sub-regions 154, 155 onto which only 0-order light is incident.

Figure 22A:
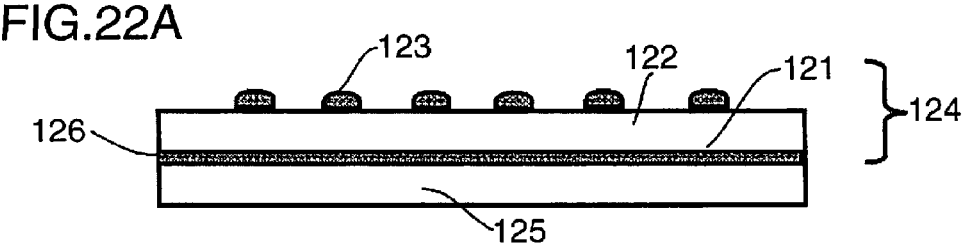
FIG. 22A is a front-view diagram illustrating schematically a light detector provided in the optical head according to the fourth embodiment of the present invention.
Figure 22B:
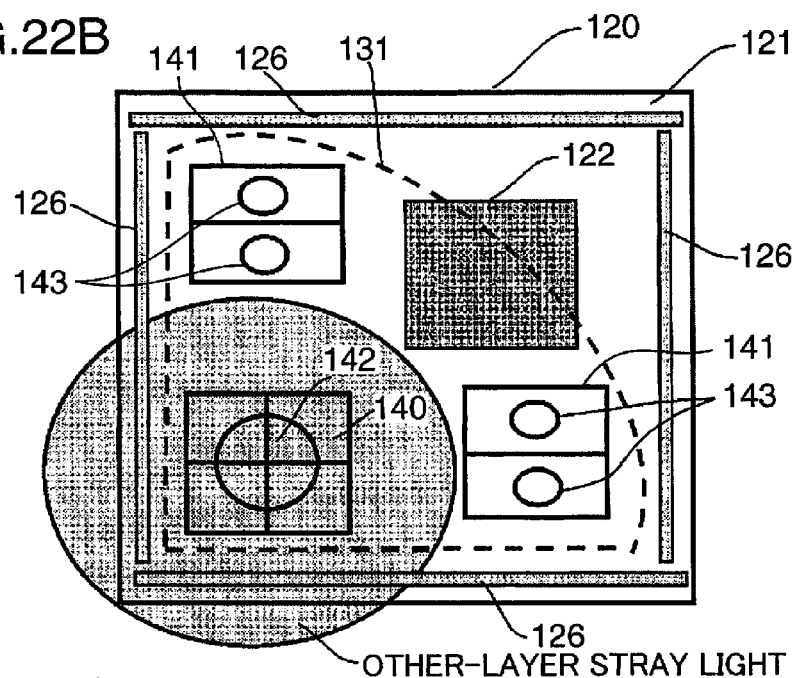
FIG. 22B is a diagram for explaining a light-receiving region in the light detector.

FIGS. 22A and 22B illustrate schematically the relative position relationship between the aperture 131 and the light-receiving surface 121 of the light detector 120. As illustrated in FIG. 22A, the light-receiving section 124 of the light detector 120 comprises the circuit section 122, the bonding layer 126 and the cover glass 125. As illustrated in FIG. 22B, the four-quadrant light-receiving region 140, the APP main regions 152, 153 and the APP sub-regions 154, 155 are formed in the light-receiving surface 121. The fan-shaped broken line in FIG. 22B denotes the shape of the aperture 131. In the present embodiment, the light-receiving surface 121 is rectangular, and the aperture 131 is fan-shaped. The central position of the fan shape is positioned in the vicinity of one of the corners of the light-receiving surface 121.

The light beams that pass through the split regions of the hologram element 150 strike the light-receiving surface 121. The light beam that passes through the main region 151 of the hologram element 150 strikes the four-quadrant light-receiving region 140 of the light-receiving surface 121, while the light beams that pass through the APP main regions 152, 153 or the APP sub-regions 154, 155 of the hologram element 150 strike respective light-receiving regions (sub-beam light-receiving regions 141) in the figure.

In the four-quadrant light-receiving region 140, a focus error signal is generated through calculation of the difference between the sum signals of diagonally-opposing regions (difference between the two sum signals obtained from the diagonally-opposing regions). An RF signal is generated on the basis of the total sum of the signals for each region of the four-quadrant light-receiving region 140. A tracking error signal is generated on the basis of a light reception signal from the sub-beam light-receiving regions 141. That is, a so-called push-pull signal is generated on the basis of the differentials between the light beams received at the sub-beam light-receiving regions 141 (light beams passing through the APP main regions 152, 153). This signal is computed with the light reception signal from the light beams (light beams passing through the APP sub-regions 154, 155) received at the sub-beam light-receiving regions 141. A tracking error signal is thus generated in accordance with a so-called APP method.

The four-quadrant light-receiving region 140 and the sub-beam light-receiving regions 141 are disposed spaced apart from each other on the light-receiving surface in such a manner that other-layer stray light does not strike the sub-beam light-receiving regions 141. To achieve a thinner optical head 200, the four-quadrant light-receiving region 140 and the sub-beam light-receiving regions 141 are disposed on the light-receiving surface 121, not along a straight line but forming an L. Specifically, the four-quadrant light-receiving region 140 is disposed in the vicinity of one corner of the rectangular light-receiving surface 121, one sub-beam light-receiving region 141 is disposed in the vicinity of a corner that is adjacent to the above corner, and a further sub-beam light-receiving region 141 is disposed in the vicinity of the other corner that is adjacent to the first corner. In such an arrangement, the center of the optical axis coincides with the center of the four-quadrant light-receiving region 140. In other words, the barycenter positions of the four-quadrant light-receiving region 140 and the sub-beam light-receiving regions 141, 141 are offset with respect to the position of the optical axis center (center position of the aperture 131) and with respect to the barycenter position of the light-receiving surface 121.

In the first embodiment, the aperture 131 and the light-receiving surface 121 of the light detector 120 are disposed in such a manner that the center (optical axis center) of the four-quadrant light-receiving region 140 coincides with the center of the aperture 131. In the fourth embodiment, by contrast, the aperture 131 is fan-shaped (non-circular), and the center of the fan shape of the aperture 131 does not coincide with the center of the four-quadrant light-receiving region 140 (center of the light beam that passes through the main beam region 151). Such a configuration allows reducing to the utmost the aperture 131 with respect to the four-quadrant light-receiving region 140 and the sub-beam light-receiving regions 141, 141. In turn, this allows reducing significantly the quantity of other-layer stray light that strikes the light-receiving surface 121, as well as the stray light that arises on account of, for instance, surface reflection in the optical elements. Focus error signal offset and tracking error signal offset can both be significantly reduced thereby, and the optical head 200 can be made significantly thinner.

Figure 22C:
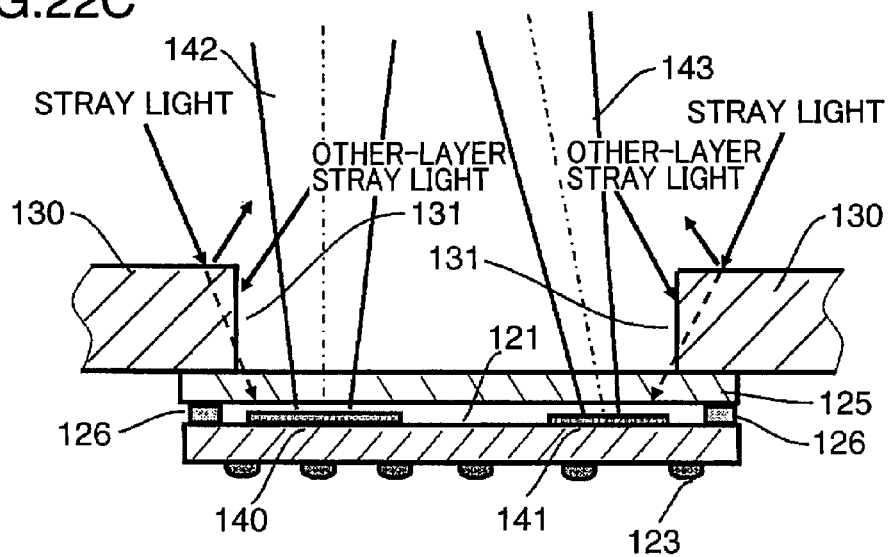
FIG. 22C is a cross-sectional diagram for explaining a relative position relationship between the light detector and an aperture.

An explanation follows next, with reference to FIG. 22C, on stray light that strikes the four-quadrant light-receiving region 140, the sub-beam light-receiving regions 141 and the bonding layer 126. FIG. 22C, illustrates, by way of arrows, the stray light that is reflected by the surface of the optical disk 201, the surface of the optical elements, the surface of the optical base 113 and so forth. Stray light can be easily blocked by sites other than the aperture 131 of the holder 130, by bringing the peripheral edge of the aperture 131 close to the four-quadrant light-receiving region 140 and the sub-beam light-receiving regions 141. Stray light that strikes the four-quadrant light-receiving section region 140 and the sub-beam light-receiving regions 141 can be significantly reduced thereby.

The bonding performance of the bonding layer 126 is impaired after several hundred hours of irradiation by light beams having a 405 nm wavelength. In the present embodiment, therefore, the bonding layer 126 is covered and hidden entirely by the holder 130 in such a manner that the bonding layer 126 does not protrude into the aperture 131. The adhesive is positioned in the vicinity of the peripheral edge of the rectangular light-receiving surface 121 in the light-receiving section 124, as illustrated in FIG. 22B. The peripheral edge of the aperture 131, as viewed from the optical axis direction, is positioned further inward than the inner edge of the adhesive, as illustrated in FIG. 22C. As a result, the bonding layer 126 is prevented from being struck by light beams having a 405 nm wavelength. The holder 130 blocks other-layer stray light that strikes mainly the scattering system, and blocks also stray light that is reflected at the surface of the optical disk 201, the surface of the optical elements, the surface of the optical base 113 and so forth, and that strikes mainly the condensing system.

The above configuration allows suppressing degradation of the bonding layer 126 that is caused by irradiation of a light beam having a wavelength of about 405 nm. The reliability of the optical head 200 can be significantly enhanced as a result.

Embodiment 5

A fifth embodiment of the present invention is explained next.

Figure 23A:
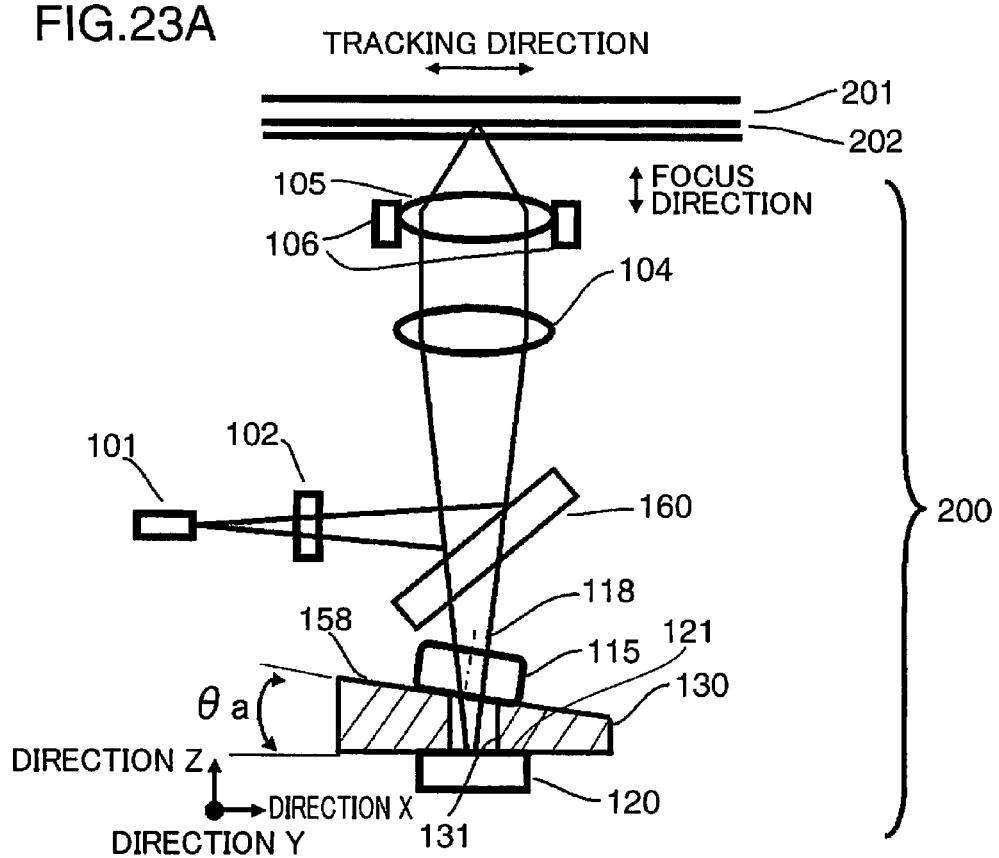
FIG. 23A is a diagram illustrating schematically an optical system of an optical head in a fifth embodiment of the present invention.
Figure 23B:
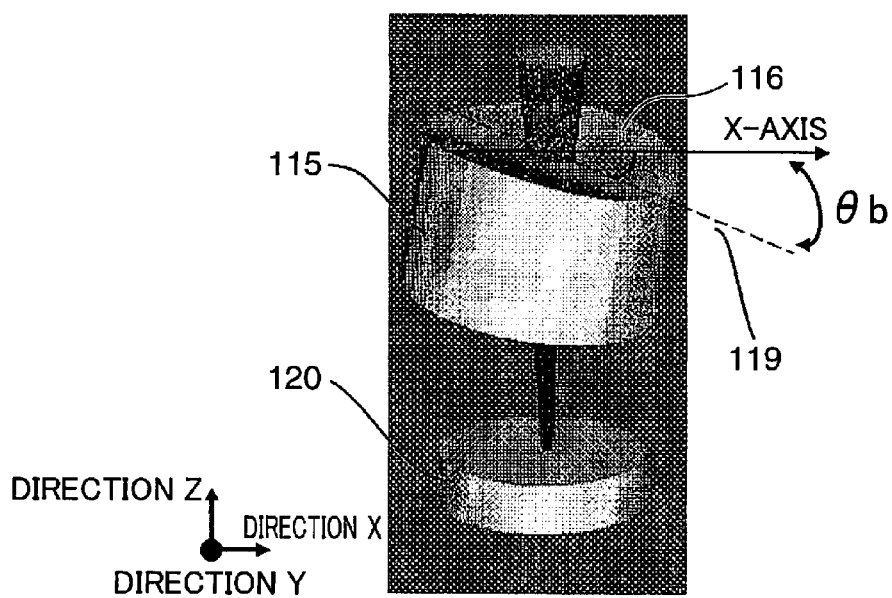
FIG. 23B is a diagram for explaining the orientation, about an axis, of the cylindrical lens provided in the optical system.

FIGS. 23A and 23B illustrate the configuration of an optical system provided in an optical head 200 according to a fifth embodiment of the present invention. The fifth embodiment differs from other embodiments in that herein the cylindrical lens 115 is inclined with respect to the light-receiving surface 121 of the light detector 120.

As illustrated in FIG. 23A the light beam emitted by the semiconductor laser 101, as a light source, is split into a plurality of light beams by the diffraction grating 102. The light beams that pass through the diffraction grating 102 are reflected by a flat-plate beam splitter 160, and are converted into parallel light beams by the collimator lens 104, and then are incident on the objective lens 105. As a result, the light beams become so-called three-beam converging light that is irradiated onto the optical disk 201.

An objective lens actuator drives the objective lens 105 in the optical axis direction (focus direction) and in the radial direction of the optical disk 201. Light reflected/refracted by the information recording layer 202 of the optical disk 201 passes again through the objective lens 105, and through the flat-plate beam splitter 160. The light beams that traverse the flat-plate beam splitter 160 pass through the cylindrical lens 115, and strike the light detector 120.

Herein, the cross section of the holder 130 is shaped as a wedge such that the first main face (cylindrical lens pressing section) of the holder 130 constitutes an inclined face 158 that is inclined with respect to the second main face (light detector pressing section). Therefore, the plane perpendicular to the lens optical axis 118 of the cylindrical lens 115 is inclined by an angle θa with respect to the light-receiving surface 121 of the light detector 120. The holder 130 is disposed in such a manner that the inclination of the first main face is contrary to the direction in which the flat-plate beam splitter 160 is inclined.

The angle θa is set in order to correct the coma aberration of reflected light beams. An optimal value of the angle θa can be set in accordance with the angle and thickness of the flat plate-shaped optical element that is disposed in the detection optical system. The inclination angle θa preferably ranges from about 5 to 20 degrees, more preferably from about 5 to 15 degrees. In the present Embodiment 5, for instance, the inclination angle θa is of 9.5 degrees. The inclination angle θa of the cylindrical lens 115 can be appropriately set, within the above ranges, in accordance with the thickness of the beam splitter 160, i.e. in accordance with the degree of aberration caused by the beam splitter 160.

In the first embodiment that uses the beam splitter 103, the angle θb of the orientation of the central generatrix 119 of the cylindrical surface 116, in the peripheral direction, is 45 degrees. In the fifth embodiment, which uses the flat-plate beam splitter 160, the angle θb of the orientation of the central generatrix 119 of the cylindrical surface 116, in the peripheral direction, is set to about 40 degrees to 30 degrees with respect to the axis in direction X of FIG. 23A, in order to cancel the astigmatism generated by the light beams as the latter pass through the flat-plate beam splitter 160. Direction X in FIG. 23A is the direction along which the thickness of the holder 130 decreases gradually.

Figure 24A:
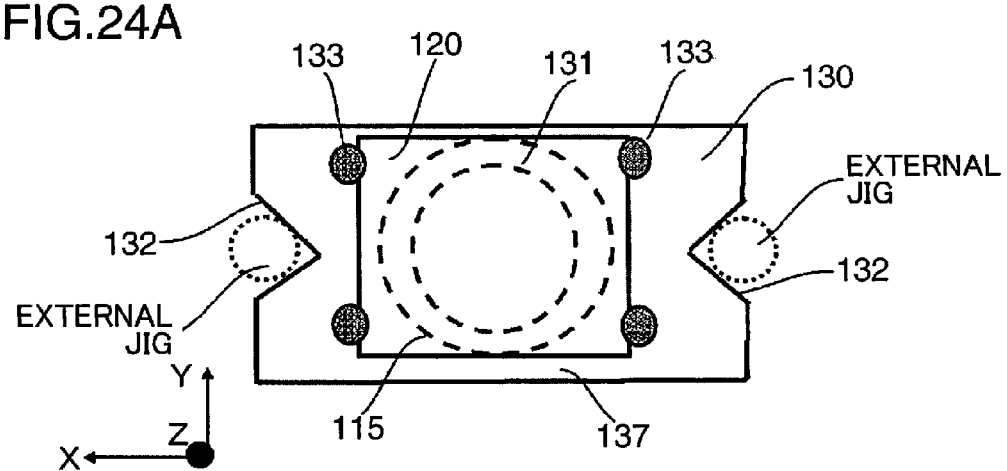
FIG. 24A is a side-view diagram illustrating schematically a detector unit in an optical head according to the fifth embodiment of the present invention.
Figure 24B:
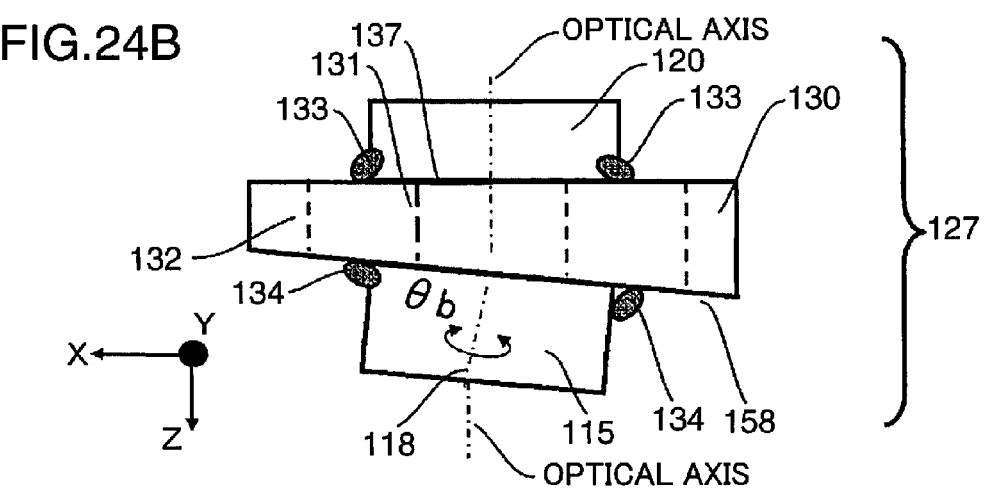
Figure 24C:
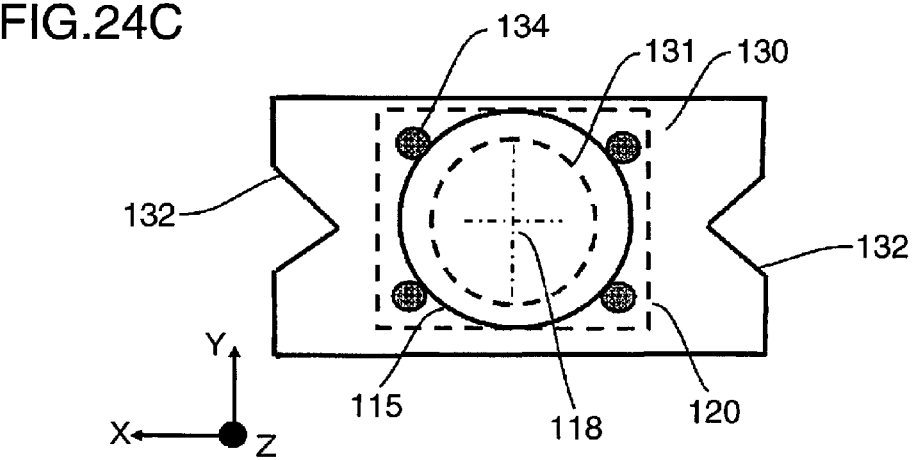
FIG. 24C is a side-view diagram illustrating schematically the detector unit.

FIGS. 24A to 24C illustrate the configuration of the detector unit 127 provided in the optical head 200 of the fifth embodiment. The detector unit 127 comprises the light detector 120, the holder 130 having the aperture 131, and the cylindrical lens 115. The light detector 120 is fixed to the holder 130, and the cylindrical lens 115 is fixed pressed against the inclined face 158 of the holder 130. The lens optical axis 118 of the cylindrical lens 115 is fixed thereby at an inclination angle that is just the angle, with respect to the optical axis of the reflected light beam, at which coma aberration is cancelled. The above configuration allows reducing significantly coma aberration caused by the light beams that pass through the flat-plate beam splitter 160, and allows improving the quality of the light beams that strike the light detector 120. That is, the above configuration allows enhancing focus error signal, tracking error signal and RF signal detection performance.

The central generatrix 119 of the cylindrical surface 116 of the cylindrical lens 115 is fixed at the center of the lens optical axis 118 of the cylindrical lens 115, but rotated by the angle θb with respect to the axis in direction X, in the light-receiving surface 121 of the holder 130 or the light detector 120. The above configuration allows canceling astigmatism generated upon passage of the light beams through the flat-plate beam splitter 160, and allows thus reducing significantly the astigmatism of the light beams that strike the light-receiving surface 121.

As a result, focus error signal, tracking error signal and RF signal detection performance can be enhanced yet further, so that there can be realized stable focus servo and tracking servo, while significantly improving both recording and reproduction performance.

Embodiment 6

An optical head 200 according to a sixth embodiment of the present invention will be explained next.

Figure 25A:
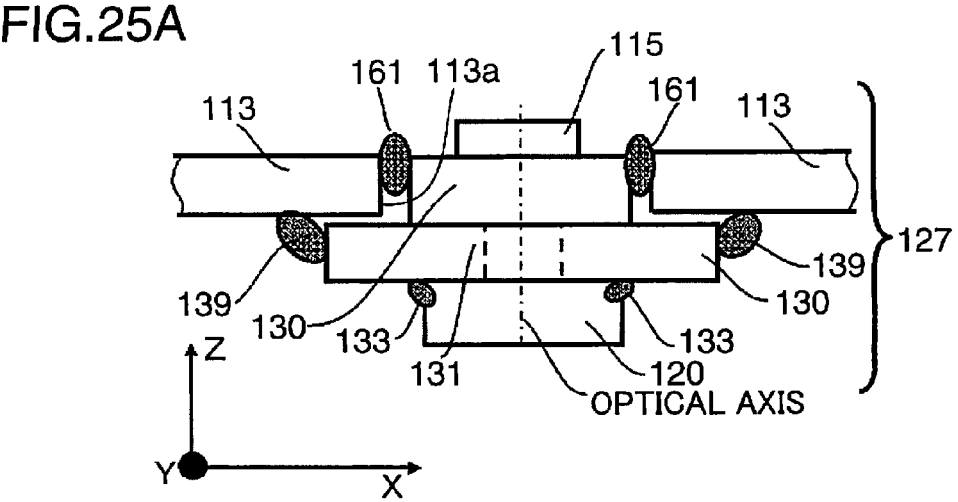
FIG. 25A is a side-view diagram of a detector unit for explaining bonding positions, between a holder and an optical base, that are provided in an optical head according to a sixth embodiment of the present invention.
Figure 25B:
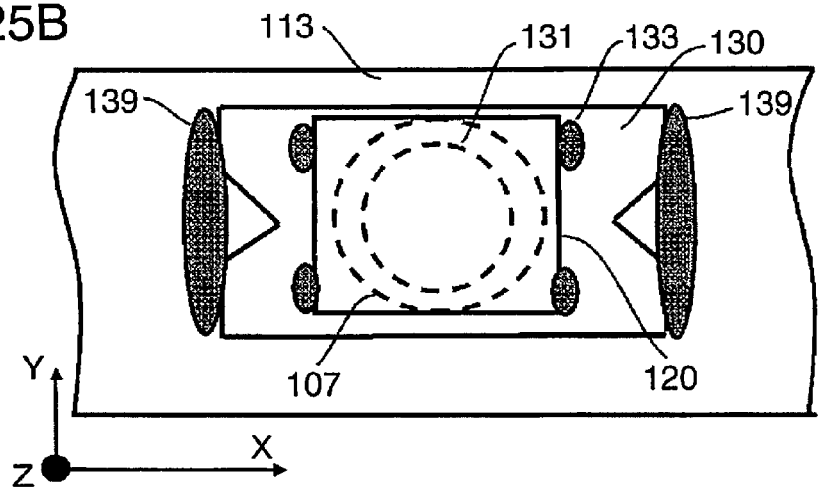
FIG. 25B is a front-view diagram of a detector unit showing the bonding positions between the holder and the optical base.
Figure 25C:
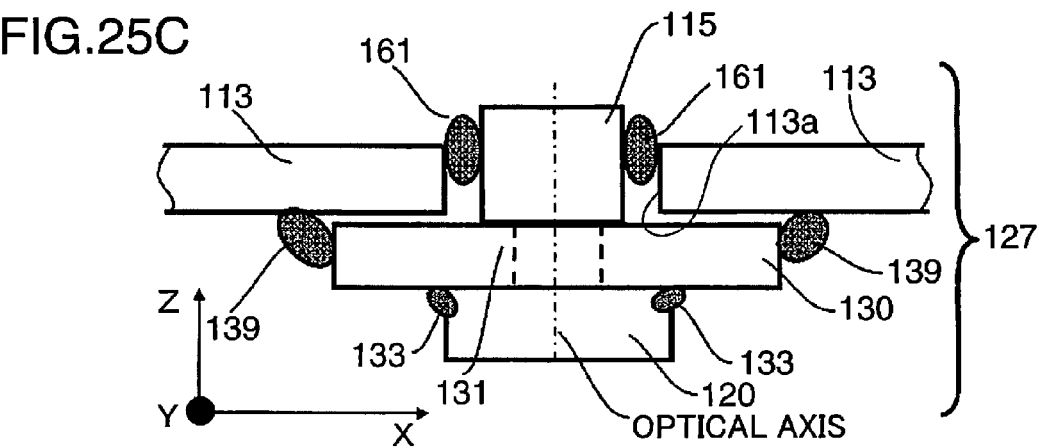
FIG. 25C is a side-view diagram of a modification of the detector unit.

FIGS. 25A and 25B illustrate a bonded state of the optical base 113 and the detector unit 127 provided in the sixth embodiment. The sixth embodiment differs from the first embodiment in that now holder supplementary bonding sections 161 are provided at different faces from those of the holder bonding sections 139, so that there are three or more bonding sections between the holder 130 and the optical base 113. The holder bonding sections 139 are disposed at two sites.

FIGS. 25A and 25B illustrate the holder bonding sections 139 and holder supplementary bonding sections 161, as the bonding sections between holder 130 and the optical base 113. A through-hole 113a is formed in the optical base 113, running through the latter in the thickness direction. The holder 13 has a portion that is inserted into the through-hole 113a, and a portion positioned at one side with respect to the optical base 113. The portion positioned at one side with respect to the optical base 113 is fixed to the optical base 113 by way of the holder bonding sections 139. The portion inserted into the through-hole 113a is fixed to the optical base 113 by way of the holder supplementary bonding sections 161.

In the first embodiment, an adhesive is coated onto two sites each, left and right, of the holder 130, such that the holder 130 is fixed to the optical base 113 at these bonding sections 139. In the case of an integral detector unit 127 having the above bonding structure, the weight of the cylindrical lens 115 gives rise to moment, about the holder bonding sections 139, that acts in a direction perpendicular to the paper. As a result, the detector unit 127 may become tilted, about the holder bonding sections 139, in a direction perpendicular to the paper (gravity direction). The optical axis becomes inclined in such a case, which may impair the focus and tracking servo signals as well as the RF signal.

In the sixth embodiment, the holder supplementary bonding sections 161 are disposed at positions in the optical axis direction (direction Z) that are different from those of the holder bonding sections 139, as illustrated in FIGS. 25A and 25B. Such a configuration allows significantly stabilizing the fixing of the holder 130 against the optical base 113, and allows reducing the inclination of the holder 130 and the detector unit 127 with respect to the optical base 113. A small optical head 200 having excellent reliability can be realized thus by preventing the detector unit 127 from tilting with respect to the optical axis direction.

In the sixth embodiment, the holder 130 is larger in the optical axis direction, and the holder supplementary bonding sections 161 are provided between the optical base 113 and the holder 130. Alternatively, however, the holder supplementary bonding sections 161 may be provided between the cylindrical lens 115 and the optical base 113, as illustrated in FIG.

25C. In this latter configuration, the holder 130 is shaped as a flat plate that does not jut into the through-hole 113a of the optical base 113. Instead, the cylindrical lens 115 is disposed inside the through-hole 113a. The bonding sites may be different, or further bonding sites may be provided, so long as the bonding sites cancel the moment generated by the weight of the cylindrical lens 115.

Embodiment 7

An optical head 200 according to a seventh embodiment of the present invention will be explained next.

Figure 26:
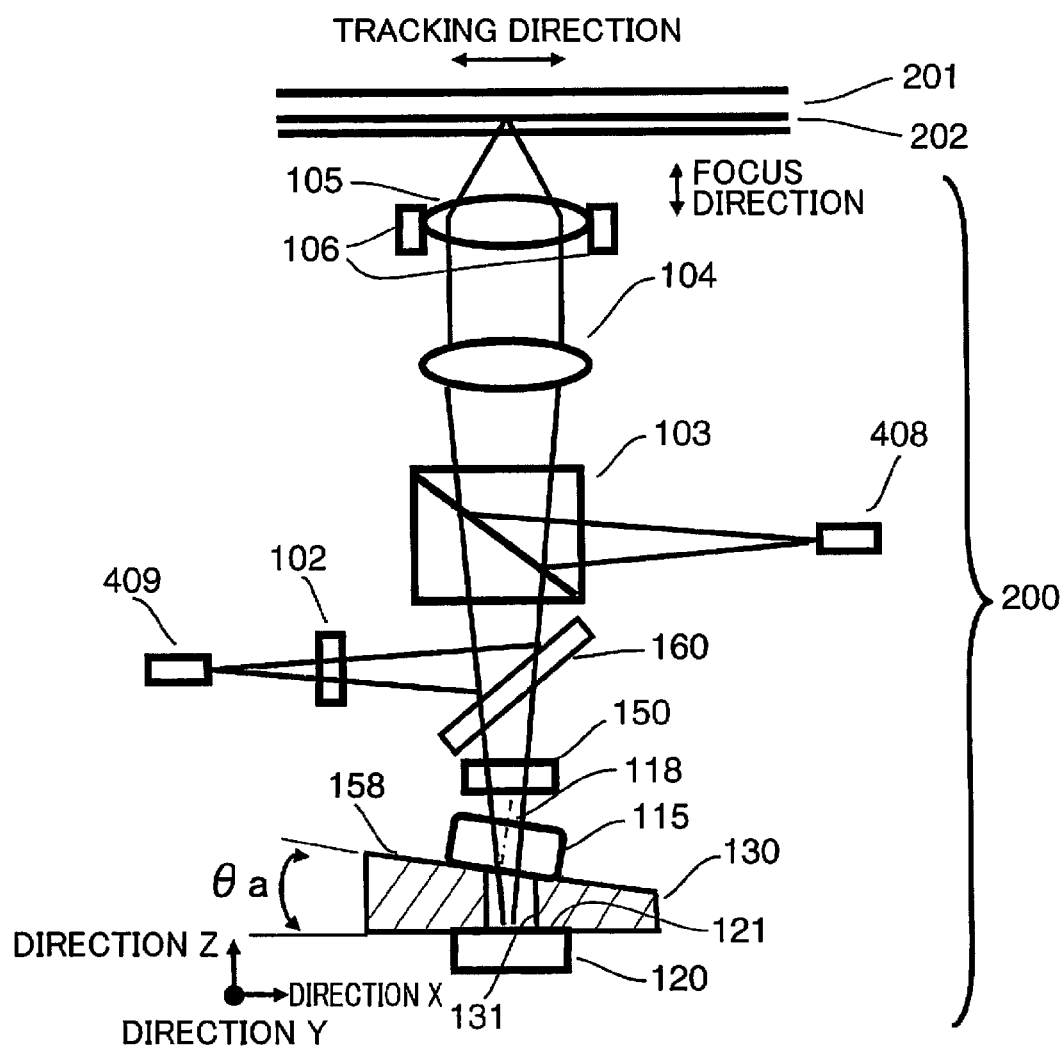
FIG. 26 is a diagram illustrating schematically an optical system of an optical head according to a seventh embodiment of the present invention.

In the fifth embodiment, a light beam from the semiconductor laser 101, as a light source, strikes the light detector 120. In the optical head 200 of the seventh embodiment, a light beam from a semiconductor laser 409, as a first light source, strikes the light detector 120, and also a light beam from a semiconductor laser 408, as a second light source, strikes the light detector 120, as illustrated in FIG. 26.

The semiconductor laser 409, as the first light source, is for instance a semiconductor laser that emits a light beam having a 405 nm wavelength. The semiconductor laser 408 as the second light source is a two-wavelength semiconductor laser that can emit, for instance, a light beam at a 780 nm wavelength and a light beam at a 650 nm wavelength.

In addition to the light sources 408, 409, the optical head 200 of the seventh embodiment comprises the diffraction grating 102, the beam splitter 103, the collimator lens 104, the objective lens 105, the flat-plate beam splitter 160, the hologram element 150, the cylindrical lens 115, the holder 130 and the light detector 120. The beam splitter 103 reflects the light beam emitted by the semiconductor laser 408, and the beam splitter 160 reflects the light beam emitted by the semiconductor laser 409. The hologram element 150 is disposed between the flat-plate beam splitter 160 and the cylindrical lens 115.

Herein, the cross section of the holder 130 is shaped as a wedge such that the first main face (cylindrical lens pressing section) of the holder 130 constitutes an inclined face 158 that is inclined with respect to the second main face (light detector pressing section) of the holder 130. Therefore, the plane perpendicular to the lens optical axis 118 of the cylindrical lens 115 is inclined by an angle θa with respect to the light-receiving surface 121 of the light detector 120. The holder 130 is disposed in such a manner that the inclination of the first main face is contrary to the direction in which the flat-plate beam splitter 160 is tilted.

Embodiment Overview

The above embodiments can be summarized as follows.

(1) The optical head in the above embodiments comprises a light source that emits a light beam; an objective lens that condenses, in the form of converging light, the light beam emitted by the light source, onto an information recording medium; a cylindrical lens, onto which a reflected light beam that is reflected by the information recording medium is incident, and which generates astigmatism for forming a focus error signal; a light detector that receives the reflected light beam passing through the cylindrical lens; and a holder that holds the cylindrical lens and the light detector; wherein the holder has a first main face and a second main face that extend in directions that intersect the optical axis of the reflected light beam, and the cylindrical lens is bonded to the first main face and the light detector is bonded to the second main face.

In the above configuration, the cylindrical lens and the light detector are constructed integrally with the holder. The relative positional error between the cylindrical lens and the light detector can be reduced thereby. This allows reducing, as a result, errors and changes in detection magnification (lateral magnification) in the detection optical system.

Also, it is possible to adjust the position of the light detector and the cylindrical lens integrally in two perpendicular directions, within a plane that is perpendicular to the light beam that is incident on the light detector, and to adjust the rotation direction of the light detector and the cylindrical lens. The relative positional error between the cylindrical lens and the light detector can be further reduced as a result.

(2) In a case where the optical head further comprises a collimating lens that modifies parallelism of the light beam from the light source, a lateral magnification of a detection optical system that comprises the objective lens, the collimating lens and the cylindrical lens, is preferably equal to or greater than 10 times. In this case, preferably, the cylindrical lens has a cylindrical surface on the surface at which the reflected light beam is incident, and a concave lens surface at an exit surface.

The above configuration allows suppressing tracking error signal offset that arises when reflected light from a layer other than the information recording layer strikes a sub-beam light-receiving region during recording and reproduction to/from a multilayer optical disk. As a result, tracking servo performance can be made more stable during recording and reproduction to/from a multilayer optical disk.

The relative positional error between the cylindrical lens and the light detector is reduced by constructing the cylindrical lens and the light detector integrally with each other. As a result there can be realized large detection magnification (lateral magnification) in a detection optical system suitable for multilayer optical disks.

The magnification of the detection optical system can be increased, and the dimensions of the detection optical system made shorter, by conferring a significant concave lens effect to the cylindrical lens. Doing so allows realizing stable tracking servo, suitable for multilayer optical disks, while reducing the size of the optical head.

Further, a focus error signal having good balance can be obtained, also in a small detection optical system, by arranging the cylindrical surface at the opposite side away from the light detector. Stable focus servo can be realized as a result, and a comparatively large astigmatic difference can be secured as well, which in turn allows obtaining a focus error signal having a long acquisition range.

The cylindrical surface is exposed outside upon assembly of the detector unit. Therefore, the orientation of the central generatrix of the cylindrical surface can be easily detected and adjusted, by way of an auto-collimator or the like, during adjustment of the direction of the central generatrix of the cylindrical surface with respect to the split directions of the light-receiving region of the light detector. The adjustment time of the optical head can be significantly shortened as a result.

The cylindrical lens and the light detector can be adjusted integrally together in direction Z (optical axis direction). This allows reducing magnification changes in the detection optical system, and allows realizing stable recording and reproduction performance in the optical head, with small fluctuation in tracking error signal offset.

(3) The radius of curvature of the concave lens surface may be equal to or smaller than 5 mm.

(4) The cylindrical lens may have a flat surface formed at the exit surface, in addition to the concave lens surface.

In the above configuration, the cylindrical lens is bonded and fixed in a state where a flat surface of the cylindrical lens is closely attached to the holder. This allows realizing a highly reliable optical head. The rotation adjustment of the cylindrical lens can be performed in a shorter time, with high precision, by arranging the cylindrical surface on the side of the incidence surface. This allows realizing an optical head that delivers excellent performance.

(5) Preferably, an aperture is formed in the holder at a position at which at least part of the reflected light beam is incident. Such a configuration allows a light beam that traverses the cylindrical lens to strike the light detector after passing through the aperture in the holder.

Also, the cylindrical lens, the light detector and the holder can be moved integrally together during adjustment of the positions of the cylindrical lens and the light detector. This allows reducing the relative positional offset between the cylindrical lens, the aperture and the light detector, in the optical axis direction and in directions that are perpendicular to the optical axis direction. The aperture diameter can be reduced thereby, which in turn allows reducing the amount of stray light leakage, onto the light detector, from stray light arising from reflection of light beams onto other layers, in particular during recording and reproduction of information in multilayer optical disks. As a result, recording and reproduction performance can be enhanced while using a smaller, thinner holder. A smaller, thinner optical head can thus be realized thereby.

(6) Preferably, the aperture has a dimension corresponding to a value that results from adding a dimension of the reflected light beam, a relative positional error between the cylindrical lens and the aperture, a relative positional error between the light detector and the aperture, and an increase in the dimension of the reflected light beam at the position of the aperture resulting from integrally adjusting the holder, the cylindrical lens and the light detector in an optical axis direction.

(7) The aperture may have a non-circular cross section.

(8) The center of the aperture may be disposed at a position different from the center of the optical axis of the reflected light beam. Such a configuration allows reducing the size of the aperture, which in turn allows reducing the amount of stray light that reaches the light detector.

(9) The surface roughness of the second main face to which the light detector is bonded may be smaller than the surface roughness of a side face of the holder. This configuration enables fine motion during adjustment of the position of the light detector, and makes for more precise positioning.

(10) The surface roughness of a predetermined region of the second main face including a central portion may be smaller than the surface roughness of an outer peripheral region of the predetermined region in the second main face. This configuration enables fine motion during adjustment of the position of the light detector, and makes for more precise positioning.

(11) The surface roughness of the first main face to which the cylindrical lens is bonded may be smaller than the surface roughness of a side face of the holder. This configuration enables fine motion during adjustment of the position of the cylindrical lens, and makes for more precise positioning.

(12) The surface roughness of a predetermined region of the first main face including a central portion may be smaller than the surface roughness of an outer peripheral region of the predetermined region in the first main face. This configuration enables fine motion during adjustment of the position of the cylindrical lens, and makes for more precise positioning.

(13) The first main face to which the cylindrical lens is bonded may be inclined relative to a face that is perpendicular to the optical axis of the reflected light beam. The above configuration allows reducing significantly coma aberration caused by the light beam that passes through the flat plate beam splitter, and allows improving the quality of the light beams that strike the light detector.

(14) In a case where the light source emits a light beam having a wavelength of about 405 nm and the light detector has a light-receiving section, a cover glass, and a bonding section that bonds the light-receiving section and the cover glass, then an inner end portion, of the bonding section, that bonds the light detector and the second main face, or an inner end portion, of the bonding section, that bonds the light-receiving section and the cover glass, may be disposed further outward than the aperture. This configuration allows suppressing adhesive deterioration that is caused by irradiation of a light beam having a wavelength of about 405 nm. The reliability of the optical head can be significantly enhanced as a result.

(15) The optical information device comprises the optical head; a transport unit for transporting the optical head; and a control circuit for controlling the transport unit and the optical head.

INDUSTRIAL APPLICABILITY

The optical head device and optical information device according to the present invention boast stable tracking control performance and can realize low information error rates, and are thus useful, for instance, in external recording devices in computers that have stable recording and reproduction performance. The optical head device and optical information device according to the present invention can be used in various applications such as video recording devices and video reproduction devices, for instance DVD recorders, BD recorders and HD-DVD recorders. The invention can also be used in recording devices of car navigation systems, portable music players, digital still cameras and digital video cameras.

The invention claimed is:

1. An optical head, comprising:
an optical base;
a light source that emits a light beam;
an objective lens that condenses, in the form of converging light, the light beam emitted by said light source, onto an information recording medium;
a cylindrical lens, onto which a reflected light beam that is reflected by the information recording medium is incident, and which generates astigmatism for forming a focus error signal;
a light detector that receives the reflected light beam passing through said cylindrical lens; and
a holder that holds said cylindrical lens and said light detector, said holder having a first main face and a second main face that extend in directions that intersect an optical axis of the reflected light beam,
wherein said cylindrical lens is bonded to said first main face and said light detector is bonded to said second main face,
wherein said holder is held by said optical base while said holder is configured to be adjusted in position with respect to said optical base in three perpendicular directions in a state that said cylindrical lens and said light detector are bonded to said holder,
wherein an aperture is formed in said holder at a position at which at least part of the reflected light beam is incident,
wherein said aperture has a dimension corresponding to a value that results from adding a dimension of the reflected light beam, a relative positional error between said cylindrical lens and said aperture, a relative positional error between said light detector and said aperture, and an increase in the dimension of the reflected light beam at the position of said aperture resulting from integrally adjusting said holder, said cylindrical lens and said light detector in an optical axis direction.

2. The optical head according to claim 1, further comprising:
a collimating lens that modifies parallelism of the light beam from said light source,
wherein a lateral magnification of a detection optical system that comprises said objective lens, said collimating lens and said cylindrical lens is equal to or greater than 10 times,
and wherein said cylindrical lens has a cylindrical surface on a surface at which the reflected light beam is incident, and a concave lens surface at an exit surface.

3. The optical head according to claim 2,
wherein a radius of curvature of said concave lens surface is equal to or smaller than 5 mm.

4. The optical head according to claim 3,
wherein said cylindrical lens has a flat surface formed at said exit surface, in addition to said concave lens surface.

5. The optical head according to claim 1,
wherein said aperture has a non-circular cross section.

6. The optical head according to claim 5,
wherein the center of said aperture is disposed at a position different from the center of said optical axis of the reflected light beam.

7. The optical head according to claim 1,
wherein a surface roughness of said second main face to which said light detector is bonded is smaller than a surface roughness of a side face of said holder.

8. The optical head according to claim 1,
wherein a surface roughness of a predetermined region of said second main face including a central portion is smaller than a surface roughness of an outer peripheral region of said predetermined region in said second main face.

9. The optical head according to claim 1,
wherein a surface roughness of said first main face to which said cylindrical lens is bonded is smaller than a surface roughness of a side face of said holder.

10. The optical head according to claim 1,
wherein a surface roughness of a predetermined region of said first main face including a central portion is smaller than a surface roughness of an outer peripheral region of said predetermined region in said first main face.

11. The optical head according to claim 1,
wherein said first main face to which said cylindrical lens is bonded is inclined relative to a plane that is perpendicular to said optical axis of the reflected light beam.

12. The optical head according to claim 1,
wherein said light source emits a light beam having a wavelength of about 405 nm,
said light detector has a light-receiving section, a cover glass, and a bonding section that bonds said light-receiving section and said cover glass, and
an inner end portion, of said bonding section, that bonds said light detector and said second main face, or an inner end portion, of said bonding section, that bonds said light-receiving section and said cover glass, is disposed further outward than said aperture.

13. An optical information device, comprising:
the optical head according to claim 1;
a transport unit for transporting said optical head; and
a control circuit for controlling said transport unit and said optical head.

* * * * *